(12) United States Patent
Forutanpour et al.

(10) Patent No.: US 11,989,710 B2
(45) Date of Patent: May 21, 2024

(54) SYSTEMS AND METHODS FOR VENDING AND/OR PURCHASING MOBILE PHONES AND OTHER ELECTRONIC DEVICES

(71) Applicant: ecoATM, LLC, San Diego, CA (US)

(72) Inventors: Babak Forutanpour, San Diego, CA (US); Joemari Enriquez, San Diego, CA (US); Jeffrey Ploetner, San Diego, CA (US); David Mersten, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 0 days.

(21) Appl. No.: 16/719,699

(22) Filed: Dec. 18, 2019

(65) Prior Publication Data
US 2020/0202319 A1 Jun. 25, 2020

Related U.S. Application Data

(60) Provisional application No. 62/782,947, filed on Dec. 20, 2018, provisional application No. 62/782,302, filed on Dec. 19, 2018.

(51) Int. Cl.
| | | |
|---|---|---|
| *G06Q 20/18* | (2012.01) | |
| *G07F 17/00* | (2006.01) | |
| *H04M 15/00* | (2006.01) | |

(52) U.S. Cl.
CPC ......... *G06Q 20/18* (2013.01); *G07F 17/0042* (2013.01); *H04M 15/715* (2013.01)

(58) Field of Classification Search
CPC ... G06Q 20/18; G07F 17/0042; H04M 15/715
See application file for complete search history.

(56) References Cited

U.S. PATENT DOCUMENTS

| | | |
|---|---|---|
| 3,808,439 A | 4/1974 | Renius |
| 4,248,334 A | 2/1981 | Hanley et al. |
| 4,272,757 A | 6/1981 | McLaughlin et al. |
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker |

(Continued)

FOREIGN PATENT DOCUMENTS

| | | |
|---|---|---|
| CA | 2760863 | 11/2010 |
| CA | 2818533 A1 | 5/2012 |

(Continued)

OTHER PUBLICATIONS

U.S. Appl. No. 16/952,340, filed Nov. 20, 2020, Unpublished.

(Continued)

*Primary Examiner* — Thien M Le
*Assistant Examiner* — Asifa Habib
(74) *Attorney, Agent, or Firm* — Perkins Coie LLP

(57) ABSTRACT

Kiosk systems and methods for vending mobile phones and other electronic devices to, and/or for purchasing mobile phones and other electronic devices from, consumers are disclosed herein. In some embodiments, such systems can include subsystems for transferring data from, e.g., a purchased phone to a vended phone.

31 Claims, 12 Drawing Sheets

(56) References Cited

U.S. PATENT DOCUMENTS

| | | |
|---|---|---|
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,159,560 A | 10/1992 | Newell et al. |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,413,454 A | 5/1995 | Movesian |
| 5,419,438 A | 5/1995 | Squyres et al. |
| 5,436,554 A | 7/1995 | Decker |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,949,901 A | 9/1999 | Nichani et al. |
| 5,965,858 A | 10/1999 | Suzuki |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,412,654 B1 | 7/2002 | Cleeve |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,575,363 B1 | 6/2003 | Leason et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Ton |
| 7,398,921 B2 | 7/2008 | Zito, Jr. |
| 7,407,392 B1 | 8/2008 | Cooke et al. |
| 7,408,674 B2 | 8/2008 | Moro et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,577,496 B2 | 8/2009 | Walker et al. |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Janger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,195,511 B2 * | 6/2012 | Bowles ............... G06Q 30/0601 |
| | | 705/308 |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,401,914 B1 | 3/2013 | Kim |
| 8,417,234 B2 | 4/2013 | Sanding et al. |
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,755,783 B2 | 6/2014 | Braham et al. |
| 8,806,280 B2 | 8/2014 | Stephenson |
| 8,823,794 B2 | 9/2014 | Suzuki et al. |
| 8,824,136 B1 | 9/2014 | Interian et al. |
| 8,743,215 B1 | 11/2014 | Lee |
| 8,922,643 B2 | 12/2014 | Ji et al. |
| 9,010,627 B1 | 4/2015 | Prasad et al. |
| 9,043,026 B2 | 5/2015 | Lien et al. |
| 9,124,056 B1 | 9/2015 | Lewis, Jr. |
| 9,189,911 B2 | 11/2015 | Kavli et al. |
| 9,195,979 B2 | 11/2015 | Geller |
| 9,256,863 B2 | 2/2016 | Chayon et al. |
| 9,317,989 B2 | 4/2016 | Grow et al. |
| 9,355,515 B2 | 5/2016 | Braham et al. |
| 9,367,982 B2 * | 6/2016 | Chayon ................... G07F 7/06 |
| 9,378,606 B2 | 6/2016 | Chayun et al. |
| 9,390,442 B2 | 7/2016 | Lyle |
| 9,497,563 B2 | 11/2016 | Hornung et al. |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,668,298 B1 | 5/2017 | Pearl et al. |
| 9,697,548 B1 | 7/2017 | Jaff et al. |
| 9,704,142 B2 | 7/2017 | Ahn |
| 9,818,160 B2 | 11/2017 | Bowles et al. |
| 9,866,664 B2 | 1/2018 | Sinha et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 10,032,140 B2 | 7/2018 | Bowles et al. |
| 10,043,339 B2 | 8/2018 | Walker et al. |
| 10,044,843 B2 | 8/2018 | Sinha et al. |

(56) References Cited

U.S. PATENT DOCUMENTS

| | | |
|---|---|---|
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,269,110 B2 | 4/2019 | Forutanpour et al. |
| 10,275,813 B2 | 4/2019 | Fu |
| 10,325,440 B2 | 6/2019 | Abdelmalak et al. |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,475,002 B2 | 11/2019 | Silva et al. |
| 10,496,963 B2 | 12/2019 | Silva et al. |
| 10,572,946 B2 | 2/2020 | Bowles et al. |
| 10,679,279 B2 | 6/2020 | Ward |
| 10,740,891 B1 | 8/2020 | Chen et al. |
| 10,803,527 B1 | 10/2020 | Zankat et al. |
| 10,824,942 B1 | 11/2020 | Bhotika et al. |
| 10,825,082 B2 * | 11/2020 | Librizzi ............... G06V 10/147 |
| 10,846,672 B2 | 11/2020 | Dion et al. |
| 10,853,873 B2 | 12/2020 | Bowles et al. |
| 10,860,990 B2 | 12/2020 | Bowles et al. |
| 10,909,673 B2 | 2/2021 | Forutanpour et al. |
| 10,970,786 B1 | 4/2021 | Matheson et al. |
| 11,024,111 B2 | 6/2021 | Abdelmalak et al. |
| 11,080,672 B2 | 8/2021 | Bowles |
| 11,107,046 B2 | 8/2021 | Bowles |
| 11,126,973 B2 | 9/2021 | Silva et al. |
| 11,164,000 B2 | 11/2021 | Lee et al. |
| 11,232,412 B2 | 1/2022 | Hunt et al. |
| 11,288,789 B1 | 3/2022 | Chen et al. |
| 11,302,038 B2 | 4/2022 | Muendel et al. |
| 11,321,768 B2 | 5/2022 | Beauchamp |
| 11,379,886 B1 | 7/2022 | Fields et al. |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0100707 A1 | 5/2003 | Hwang et al. |
| 2003/0146898 A1 | 8/2003 | Kawasaki et al. |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | VanDerWeij |
| 2004/0156667 A1 | 8/2004 | VanDerWeij et al. |
| 2004/0186744 A1 | 9/2004 | Lux |
| 2004/0189812 A1 | 9/2004 | Gustavsson |
| 2004/0205915 A1 | 10/2004 | DeLaCruz |
| 2094/0200902 | 10/2004 | Ishioroshi |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2995/0043897 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0139661 A1 | 6/2005 | Eglen et al. |
| 2005/0143149 A1 | 6/2005 | Becker et al. |
| 2905/0137942 | 6/2005 | LaFluer |
| 2005/0187657 A1 | 8/2005 | Hashimoto et al. |
| 2905/0167620 | 8/2005 | Cho et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0167580 A1 | 1/2006 | Whittier |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0184379 A1 | 8/2006 | Tan et al. |
| 2006/0195384 A1 | 8/2006 | Bauer et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0217152 A1 | 11/2006 | Fok et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagishi |
| 2007/0012665 A1 | 1/2007 | Nelson |
| 2007/0013124 A1 | 1/2007 | Graef et al. |
| 2007/0013139 A1 | 1/2007 | Kumagai |
| 2007/0032098 A1 | 2/2007 | Bowles et al. |
| 2007/0050083 A1 | 3/2007 | Signorelli |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0150403 A1 | 6/2007 | Mock et al. |
| 2007/0140310 A1 | 7/2007 | Holton et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1 | 10/2008 | Cai et al. |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |

(56) References Cited

U.S. PATENT DOCUMENTS

| | | |
|---|---|---|
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0169231 A1 | 7/2010 | Bowles et al. |
| 2010/0185506 A1 | 7/2010 | Wolff |
| 2010/0219234 A1 | 9/2010 | Forbes |
| 2010/0228676 A1 | 9/2010 | Librizzi et al. |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0312639 A1 | 12/2010 | Mastronardi |
| 2011/0035322 A1 | 2/2011 | Lively |
| 2011/0043628 A1 | 2/2011 | Yun |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0113479 A1 | 5/2011 | Ganem |
| 2011/0173576 A1 | 7/2011 | Murphy et al. |
| 2011/0235853 A1 | 9/2011 | Bowles et al. |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0191562 A1 | 7/2012 | Bowles et al. |
| 2012/0235812 A1 | 9/2012 | Mello et al. |
| 2012/0254046 A1* | 10/2012 | Librizzi .............. G06Q 30/0237 705/306 |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0112440 A1 | 5/2013 | Alsaif et al. |
| 2013/0124426 A1* | 5/2013 | Bowles ............... H04M 1/0287 705/308 |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0157641 A1 | 6/2013 | Brahami et al. |
| 2013/0159119 A1 | 6/2013 | Henderson et al. |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0191236 A1 | 7/2013 | Bowles |
| 2013/0198089 A1 | 8/2013 | Bowies |
| 2013/0198144 A1 | 8/2013 | Bowles |
| 2013/0200912 A1 | 8/2013 | Panagas |
| 2013/0226679 A1 | 8/2013 | Bowles |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0275314 A1 | 10/2013 | Bowles |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0038556 A1 | 2/2014 | DeSousa |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0147004 A1 | 5/2014 | Uchida |
| 2014/0150100 A1 | 5/2014 | Gupta et al. |
| 2014/0156883 A1* | 6/2014 | Bowles .................. G06F 13/10 710/33 |
| 2014/0178029 A1 | 6/2014 | Raheman et al. |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088698 A1 | 3/2015 | Ackerman |
| 2015/0088731 A1 | 3/2015 | Ackerman |
| 2015/0170237 A1* | 6/2015 | Powell .................. G06Q 20/18 705/26.4 |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0309912 A1 | 10/2015 | Nguyen et al. |
| 2015/0120485 A1 | 11/2015 | Nash |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1* | 1/2016 | Burmester .......... G06Q 30/0278 705/306 |
| 2016/0019685 A1* | 1/2016 | Nguyen ............... G06K 9/6201 382/141 |
| 2016/0055392 A1 | 2/2016 | Nakano |
| 2016/0078434 A1* | 3/2016 | Huxham ................ G06Q 20/36 705/71 |
| 2016/0087381 A1 | 3/2016 | Wong et al. |
| 2016/0091549 A1 | 3/2016 | Snook et al. |
| 2016/0092849 A1 | 3/2016 | Cirannek et al. |
| 2016/0098689 A1 | 4/2016 | Bowles et al. |
| 2016/0125367 A1* | 5/2016 | Bowles .................. G06Q 20/18 705/14.11 |
| 2016/0125548 A1 | 5/2016 | Bowles et al. |
| 2016/0125612 A1 | 5/2016 | Seki et al. |
| 2016/0132840 A1 | 5/2016 | Bowles et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0301786 A1 | 10/2016 | Koltsov et al. |
| 2016/0328684 A1 | 11/2016 | Bowles et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0110902 A1 | 4/2017 | Miller |
| 2017/0115235 A1 | 4/2017 | Ohlsson et al. |

(56) References Cited

U.S. PATENT DOCUMENTS

| | | |
|---|---|---|
| 2017/0169401 A1 | 6/2017 | Beane et al. |
| 2017/0221110 A1 | 8/2017 | Sullivan et al. |
| 2017/0256051 A1 | 9/2017 | Dwivedi et al. |
| 2017/0256119 A1* | 9/2017 | Abdelmalak .......... G06Q 20/18 |
| 2017/0278191 A1 | 9/2017 | Tassone et al. |
| 2017/0286920 A1 | 10/2017 | Silva et al. |
| 2017/0301010 A1 | 10/2017 | Bowles et al. |
| 2017/0323279 A1 | 11/2017 | Dion et al. |
| 2017/0343481 A1 | 11/2017 | Jahanshahi et al. |
| 2017/0372273 A1 | 12/2017 | Bowles et al. |
| 2018/0084094 A1 | 3/2018 | Sinha et al. |
| 2018/0101810 A1 | 4/2018 | Feng et al. |
| 2018/0157246 A1 | 6/2018 | Huang et al. |
| 2018/0157820 A1 | 6/2018 | Adams et al. |
| 2018/0160269 A1 | 6/2018 | Baarman et al. |
| 2018/0165655 A1* | 6/2018 | Marcelle ................ G07F 9/001 |
| 2018/0240144 A1 | 8/2018 | Curtis |
| 2018/0260794 A1 | 9/2018 | Bowles et al. |
| 2018/0293566 A1* | 10/2018 | Engles ................... G06Q 30/08 |
| 2018/0293664 A1 | 10/2018 | Zhang et al. |
| 2018/0321163 A1 | 11/2018 | Casadio |
| 2018/0322623 A1 | 11/2018 | Memo et al. |
| 2018/0342050 A1 | 11/2018 | Fitzgerald et al. |
| 2018/0350163 A1 | 12/2018 | Pofale et al. |
| 2019/0019147 A1 | 1/2019 | McCarty et al. |
| 2019/0051090 A1* | 2/2019 | Goldberg ............... G07F 9/001 |
| 2019/0066075 A1 | 2/2019 | Lobo et al. |
| 2019/0066439 A1 | 2/2019 | Pinkus |
| 2019/0073566 A1 | 3/2019 | Brauer |
| 2019/0073568 A1 | 3/2019 | He et al. |
| 2019/0102874 A1 | 4/2019 | Goja |
| 2019/0166278 A1 | 5/2019 | Hiyama et al. |
| 2019/0222748 A1 | 7/2019 | Weir et al. |
| 2019/0251777 A1 | 8/2019 | Abdelmalak et al. |
| 2019/0272628 A1 | 9/2019 | Tsou |
| 2019/0279431 A1 | 9/2019 | Wurmfeld et al. |
| 2019/0287141 A1 | 9/2019 | Bordeleau et al. |
| 2019/0318465 A1 | 10/2019 | Nguyen |
| 2019/0325530 A1 | 10/2019 | Bowles et al. |
| 2019/0372827 A1 | 12/2019 | Vasseur et al. |
| 2020/0020097 A1 | 1/2020 | Do et al. |
| 2020/0042969 A1* | 2/2020 | Ray ....................... G07F 11/40 |
| 2020/0066067 A1 | 2/2020 | Herman et al. |
| 2020/0090137 A1 | 3/2020 | Bowles et al. |
| 2020/0104720 A1 | 4/2020 | Boa et al. |
| 2020/0126046 A1 | 4/2020 | Bowles |
| 2020/0151677 A1 | 5/2020 | Bowles et al. |
| 2020/0151679 A1 | 5/2020 | Hunt et al. |
| 2020/0167748 A1 | 5/2020 | Dion et al. |
| 2020/0175669 A1 | 6/2020 | Bian et al. |
| 2020/0202405 A1 | 6/2020 | Glickman et al. |
| 2020/0241891 A1 | 7/2020 | Li et al. |
| 2020/0258343 A1 | 8/2020 | Forutanpour et al. |
| 2020/0259300 A1 | 8/2020 | Forutanpour et al. |
| 2020/0265487 A1 | 8/2020 | Forutanpour et al. |
| 2020/0393742 A1 | 12/2020 | Dion et al. |
| 2020/0410793 A1* | 12/2020 | Folco ................... G06Q 30/0645 |
| 2021/0012315 A1 | 1/2021 | Priebatsch |
| 2021/0035206 A1 | 2/2021 | Bowles et al. |
| 2021/0081698 A1 | 3/2021 | Lindeman et al. |
| 2021/0081914 A1 | 3/2021 | Nelms et al. |
| 2021/0110366 A1 | 4/2021 | Dion et al. |
| 2021/0110440 A1 | 4/2021 | Dion et al. |
| 2021/0174312 A1 | 6/2021 | Bowles et al. |
| 2021/0192484 A1 | 6/2021 | Forutanpour et al. |
| 2021/0209512 A1 | 7/2021 | Gaddam et al. |
| 2021/0224867 A1 | 7/2021 | Bordeleau et al. |
| 2021/0254966 A1 | 8/2021 | Hur et al. |
| 2021/0255240 A1 | 8/2021 | McGrath |
| 2021/0272208 A1 | 9/2021 | Leise et al. |
| 2021/0278338 A1 | 9/2021 | Jung |
| 2021/0295494 A1 | 9/2021 | Forutanpour et al. |
| 2021/0327203 A1* | 10/2021 | Shah ....................... G06F 21/32 |
| 2021/0357545 A1 | 11/2021 | Sugawara et al. |
| 2022/0027879 A1 | 1/2022 | Bowles et al. |
| 2022/0050897 A1 | 2/2022 | Gaddam et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0172178 A1 | 6/2022 | Forutanpour et al. |
| 2022/0187802 A1 | 6/2022 | Wittenberg et al. |
| 2022/0198407 A1 | 6/2022 | Beane et al. |
| 2022/0262189 A1* | 8/2022 | Dion ...................... G06Q 20/18 |
| 2022/0277281 A1 | 9/2022 | Dion et al. |
| 2023/0007937 A1 | 1/2023 | Forutanpour et al. |
| 2023/0077844 A1 | 3/2023 | Bowles et al. |
| 2023/0100849 A1 | 3/2023 | Bowles et al. |
| 2023/0238751 A1 | 7/2023 | Forutanpour et al. |
| 2023/0274346 A1 | 8/2023 | Bowles et al. |

FOREIGN PATENT DOCUMENTS

| | | |
|---|---|---|
| CA | 2866147 | 9/2013 |
| CA | 3069888 | 1/2019 |
| CA | 3069890 | 1/2019 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 201956656 U | 8/2011 |
| CN | 102246384 | 11/2011 |
| CN | 102315630 A | 1/2012 |
| CN | 102467728 A | 5/2012 |
| CN | 202351953 | 7/2012 |
| CN | 202353475 U | 7/2012 |
| CN | 202394296 | 8/2012 |
| CN | 102654927 | 9/2012 |
| CN | 102682597 A | 9/2012 |
| CN | 202564711 U | 11/2012 |
| CN | 102812500 | 12/2012 |
| CN | 202585951 U | 12/2012 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 103765455 | 4/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 103999053 | 8/2014 |
| CN | 302944037 S | 9/2014 |
| CN | 302944252 S | 9/2014 |
| CN | 302944253 S | 9/2014 |
| CN | 303042750 S | 12/2014 |
| CN | 205103926 U | 3/2016 |
| CN | 205129815 U | 4/2016 |
| CN | 205132514 U | 4/2016 |
| CN | 205140067 U | 4/2016 |
| CN | 205247436 | 5/2016 |
| CN | 106022379 A | 10/2016 |
| CN | 303896361 S | 10/2016 |
| CN | 106203643 A | 12/2016 |
| CN | 106293734 A | 1/2017 |
| CN | 106372638 A | 2/2017 |
| CN | 304051346 S | 2/2017 |
| CN | 304139831 S | 5/2017 |

(56) References Cited

FOREIGN PATENT DOCUMENTS

| | | |
|---|---|---|
| CN | 304169301 S | 6/2017 |
| CN | 206440635 U | 8/2017 |
| CN | 107220640 A | 9/2017 |
| CN | 206466691 U | 9/2017 |
| CN | 107514978 A | 12/2017 |
| CN | 206861374 U | 1/2018 |
| CN | 207037788 U | 2/2018 |
| CN | 105444678 B | 3/2018 |
| CN | 304702339 S | 6/2018 |
| CN | 304702340 S | 6/2018 |
| CN | 304747709 S | 7/2018 |
| CN | 304795309 S | 8/2018 |
| CN | 108596658 A | 9/2018 |
| CN | 108647588 A | 10/2018 |
| CN | 207993120 U | 10/2018 |
| CN | 207993121 U | 10/2018 |
| CN | 207995226 U | 10/2018 |
| CN | 304842785 S | 10/2018 |
| CN | 108764236 A | 11/2018 |
| CN | 208086545 U | 11/2018 |
| CN | 208172834 U | 11/2018 |
| CN | 304958348 S | 12/2018 |
| CN | 305014434 S | 1/2019 |
| CN | 305014435 S | 1/2019 |
| CN | 109831575 A | 5/2019 |
| CN | 208819255 U | 5/2019 |
| CN | 208819289 U | 5/2019 |
| CN | 208819290 U | 5/2019 |
| CN | 208969761 U | 6/2019 |
| CN | 305275610 S | 7/2019 |
| CN | 110321082 A | 10/2019 |
| CN | 110333876 A | 10/2019 |
| CN | 110347341 A | 10/2019 |
| CN | 110595361 A | 12/2019 |
| CN | 110653162 A | 1/2020 |
| CN | 110675399 A | 1/2020 |
| CN | 110751002 A | 2/2020 |
| CN | 110788015 A | 2/2020 |
| CN | 110796646 A | 2/2020 |
| CN | 110796647 A | 2/2020 |
| CN | 110796669 A | 2/2020 |
| CN | 110827244 A | 2/2020 |
| CN | 110827245 A | 2/2020 |
| CN | 110827246 A | 2/2020 |
| CN | 110827247 A | 2/2020 |
| CN | 110827248 A | 2/2020 |
| CN | 110827249 A | 2/2020 |
| CN | 110880028 A | 3/2020 |
| CN | 110928730 A | 3/2020 |
| CN | 305638504 S | 3/2020 |
| CN | 110976302 A | 4/2020 |
| CN | 111080184 A | 4/2020 |
| CN | 210348162 U | 4/2020 |
| CN | 305767220 S | 5/2020 |
| CN | 210666955 U | 6/2020 |
| CN | 305818424 S | 6/2020 |
| CN | 111530774 A | 8/2020 |
| CN | 211291337 U | 8/2020 |
| CN | 211402187 U | 9/2020 |
| CN | 211515235 U | 9/2020 |
| CN | 211538600 U | 9/2020 |
| CN | 306113050 S | 10/2020 |
| CN | 306113051 S | 10/2020 |
| CN | 306113052 S | 10/2020 |
| CN | 212031269 U | 11/2020 |
| CN | 306164092 S | 11/2020 |
| CN | 306164093 S | 11/2020 |
| CN | 306164094 S | 11/2020 |
| CN | 306164095 S | 11/2020 |
| CN | 212597202 U | 2/2021 |
| CN | 306323627 S | 2/2021 |
| CN | 212681731 U | 3/2021 |
| CN | 213001252 U | 4/2021 |
| CN | 202702438 U | 1/2023 |
| CN | 202711369 U | 1/2023 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 2810219 | 12/2014 |
| EP | 3206194 A1 | 8/2017 |
| EP | 3255753 | 12/2017 |
| EP | 2428072 | 1/2018 |
| FR | 3047833 B1 | 3/2018 |
| GB | 2167553 | 5/1986 |
| HK | 30014296 A | 8/2020 |
| JP | H7334583 | 12/1995 |
| JP | H11242005 | 9/1999 |
| JP | 2000121564 | 4/2000 |
| JP | 2000171409 A | 6/2000 |
| JP | 2000180371 | 6/2000 |
| JP | 3123095 | 1/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 20120504832 | 2/2012 |
| JP | 2012058932 | 3/2012 |
| JP | 2013033361 | 2/2013 |
| JP | 2013037441 | 2/2013 |
| JP | 2013551823 | 8/2013 |
| JP | 2017093938 | 6/2017 |
| JP | 2019012474 | 1/2019 |
| JP | 3223233 U | 9/2019 |
| JP | 2022539909 A | 9/2022 |
| JP | 2022539910 A | 9/2022 |
| JP | 2022539912 A | 9/2022 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101326680 | 11/2013 |
| KR | 101329949 | 11/2013 |
| KR | 20140037543 | 3/2014 |
| KR | 101599251 | 3/2016 |

(56) References Cited

FOREIGN PATENT DOCUMENTS

| | | |
|---|---|---|
| KR | 20180088062 | 8/2018 |
| KR | 20180088063 | 8/2018 |
| KR | 1020180086617 | 8/2018 |
| KR | 20180117278 | 10/2018 |
| KR | 20190026131 | 3/2019 |
| KR | 20190107593 | 9/2019 |
| KR | 20190107595 | 9/2019 |
| KR | 20190107596 | 9/2019 |
| KR | 1020190107594 | 9/2019 |
| KR | 1020200115308 | 10/2020 |
| KR | 20210020717 | 2/2021 |
| KR | 1020210059148 | 5/2021 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011115857 A2 | 9/2011 |
| WO | WO2011131016 | 10/2011 |
| WO | WO2012073126 | 6/2012 |
| WO | WO2012138679 | 10/2012 |
| WO | WO2013002748 | 1/2013 |
| WO | WO2013063042 | 5/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | WO2015196175 | 12/2016 |
| WO | WO2017034441 | 3/2017 |
| WO | WO2017081527 | 5/2017 |
| WO | WO2017156046 | 9/2017 |
| WO | WO2018124669 | 7/2018 |
| WO | WO2018133068 | 7/2018 |
| WO | WO2018146374 | 8/2018 |
| WO | WO2019012305 | 1/2019 |
| WO | WO2019012505 | 1/2019 |
| WO | WO2019012506 | 1/2019 |
| WO | WO2019212513 | 11/2019 |
| WO | WO2019212515 | 11/2019 |
| WO | WO2020082991 | 4/2020 |
| WO | WO2020204503 | 10/2020 |
| WO | WO2021019286 | 2/2021 |
| WO | WO2021082918 A1 | 5/2021 |
| WO | WO2021082919 A1 | 5/2021 |
| WO | WO2021082920 A1 | 5/2021 |
| WO | WO2021082921 A1 | 5/2021 |
| WO | WO2021082922 A1 | 5/2021 |
| WO | WO2021082923 | 5/2021 |

OTHER PUBLICATIONS

2006 Florida Statutes Title XXXIII, Chapter 538, Sections 538.03 and 538.04, 7 pages.

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL: http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

CNET, "Tackling LCD 'burn ins', and dead/stick Pixels", published Sep. 2, 2009, retrieved from http://www.cnet.com/news/tackling-lcd-burn-ins-and-deadstuck-pixels/.

Cybercom Group Europe AB, "The OMSI 2.0 Interface Supports," OMSI 2.0 Description, avaiiabie at least before Oct. 2008, 1 page.

Cybercom Group Europe AB, "OMSI Forum," Downloads, 2005, 2 pages.

Cybercom Group Europe AB, "OMSI Provides Easy Service and Maintenance for Mobile Phones," Press Release, 2005, 1 page.

Cybercom Group, "Leading Telecom Organisations Address Device Management Issues," Press Release, 2007, 1 page.

Evgenii Masunov, Mar. 25, 2010, http://www.appleinsider.ru/news/ipone-obladaet-luchshim-tachskrinom-provereno robotom.html, 4 pages.

Foster et al., "Automated Visual Inspection: A Tutorial" 1990 Computers Ind. Engng. vol. 18(4): 493-504.

Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.

Graffia et al., "Retail Station for E-Device Identification, Assessment, and Trade-In", Jun. 6, 2014 (Drawings and Specification) (Year: 2014).

GSM Arena Glossary, "LCD (Liquid Crystal Display", retrieved from http://www.gsmarena.com/glossary.php3?term=lcd on Apr. 28, 2016, 1 page.

International Numbering Plan, www.numberingplans.com, 2 pages.

Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].

Kanter, James Max, "Color Crack:ldentifying Cracks in Glass," dated Dec. 9, 2014; retrieved from the internet http://www.jmaxkanter.com/static/papers/color_crack.pdf on Sep. 22, 2017.

Lambert, Emily, "Use It Up, Wear It Out", Forbes 175.5 (2005): 77-78. Business Source Complete. Web. Jan. 6, 2015, 3 pages.

Littleton Partners with Donations Ink (Jan. 19, 2006) US Fed News Service, Including US State News. Web. Jan. 6, 2015, 1 page.

Mobilegazette.com, "2006 in Review: The Good, The Bad and The Ugly", published Dec. 2006, retrieved from http://www.mobilegazette.com/2006-review-06x12x22.htm on Nov. 11, 2015.

Oliveira, et al., "Automatic crack detection on road imagery using anisotropic diffusion and region linkage," 18th European Signal Processing Conference (EUSIPCO—2010), Aug. 23, 2010, pp. 274-278.

PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.

Perng et al., "A Novel Vision System for CRT Panel Auto-Inspection", Proceedings of the 2005 IEEE International Conference on Mechatronics, Jul. 10-12, 2005, p. 4.

Perng et al., "A Novel Vision System for CRT Panel Auto-Inspection", Journal of the Chinese Institute of Industrial Engineers, vol. 24, No. 5, pp. 341-350 (2007).

Phifer, "How to Use your 3G Phone as a Wireless Broad Band Modem," Computer Weekly News, 2007, 6 pages.

(56) References Cited

OTHER PUBLICATIONS

Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
Romano "Recycling a Phone at EcoATM is an Easy Route to Feeling Green," Xconomy, Jan. 22, 2014, pp. 1-3.
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
SimplySellular, "Get Cash for your Old Cell Phone", published Apr. 2, 2010, retrieved from http://simplysellular.com/conditions.php on Jan. 6, 2015, 2 pages.
Shotton et al., "Efficiently Combining Contour and Texture Cues for Object Recognition", Proceedings of the British Machine Vision Conference 2008, (Sep. 1, 2008), p. 7.1-7.10 * abstract *.
Sony Ericsson Mobile Communications AB, "T68i/T68ie," White Paper, 2002, 71 pages.
Sony Ericsson Mobile Communications AB, "P800/P802," WhitePaper, 2003, 128 pages.
Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
TECACE Software: "Your phone appraisal-Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology (2009).
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Yahoo Answers, "What is a Clean ESN?" published Jun. 23, 2009, retrieved from http://web.archive.org/web/20090623215042/http://answers.yahoo.com/question/inde.8020US?qid=20080318061012AANFRco on Apr. 3, 2014.
Zhang, Yiyang, "The design of glass crack detection system based on image preprocessing technology,"2014 IEEE 7th Joint International Information Technology and Artificial Intelligence Conference, IEEE, Dec. 20, 2014; pp. 39-42.
International Search Report and Written Opinion dated Mar. 25, 2020 in International Application No. PCT/US2019/067268, 11 pages.
Invitationto Pay Additional Fees & Partial Search Report dated Sep. 13, 2021 in International Application No. PCT/US2020/065774, 12 pages.
Non-Final Office Action mailed Oct. 27, 2022 in U.S. Appl. No. 17/125,994, 39 pages.
Tech Spurt, "Sandisk iXpand Review | Wireless Charger & Auto Photo Backup!" https://www.youtube.com/watch?v=zemKQ6xIJLww, Aug. 21, 2019, 1 page.
Restriction Requirement mailed Jun. 16, 2023 in U.S. Appl. No. 17/645,039, 7 pages.
Bhule et al., "Environmental and economic trade-offs in consumer electronic products recycling: a case study of cell phones and computers," IEEE International Symposium on Electronics and the Environment, Conference Record, 2004.
Geyer et al. "The economics of cell phone reuse and recylcing," The International Journal of Advanced Manufacturing Technology, 47(5): 515-525, 2010.
International Search Report and Written Opinion mailed May 19, 2022 in International Application No. PCT/US2021/073020, 22 pages.
Non-Final Office Action response filed Apr. 27, 2023 in U.S. Appl. No. 17/125,994, 26 pages.
Final Office Action mailed Aug. 15, 2023 in U.S. Appl. No. 17/125,994, 59 pages.

* cited by examiner

SYSTEMS AND METHODS FOR VENDING AND/OR PURCHASING MOBILE PHONES AND OTHER ELECTRONIC DEVICES

CROSS-REFERENCE TO RELATED APPLICATIONS INCORPORATED BY REFERENCE

The present application claims priority to and the benefit of: U.S. Provisional Application No. 62/782,302, titled SYSTEMS AND METHODS FOR VENDING AND/OR PURCHASING MOBILE PHONES AND OTHER ELECTRONIC DEVICES, and filed Dec. 19, 2018; and U.S. Provisional Application No. 62/782,947, titled SYSTEMS AND METHODS FOR VENDING AND/OR PURCHASING MOBILE PHONES AND OTHER ELECTRONIC DEVICES, and filed Dec. 20, 2018; each of the above-listed U.S. Provisional Applications is incorporated herein by reference in its entirety.

TECHNICAL FIELD

The present disclosure is directed generally to systems and methods for vending, purchasing, transferring data to or from, recycling, and/or performing other processes associated with mobile phones and/or other electronic devices.

BACKGROUND

Consumer electronic devices, such as mobile phones, laptop computers, notebooks, tablets, MP3 players, etc., are ubiquitous. Currently there are over 6 billion mobile devices in use in the world; and the number of these devices is growing rapidly with more than 1.5 billion mobile phones being sold in 2018 alone. There are now more mobile devices in use than there are people on the planet. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their mobile phones and other electronic devices to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

As an alternative to retailer trade-in or buyback programs, consumers can now recycle and/or sell their used mobile phones using self-service kiosks located in malls, retail stores, or other publicly accessible areas. Such kiosks are operated by ecoATM, LLC, the assignee of the present application, and embodiments of such kiosks are disclosed in, for example, U.S. Pat. Nos. 10,475,002; 10,445,708; 10,438,174; 10,417,615; 10,269,110; 10,127,647; 9,911,102; 9,885,672; 8,463,646; 8,423,404; 8,239,262; 8,200,533; 8,195,511; and 7,881,965; each of which is incorporated herein by reference in its entirety.

There is a need for systems that enable consumers to easily sell their old mobile phones and purchase new ones. Additionally, there is a need for systems that enable consumers to conveniently transfer the data from their old mobile phone to a newly purchased phone. Simplifying the selling and purchasing processes, enhancing the consumer experience, and discouraging fraud can incentivize consumers to dispose of their old phones and other electronic devices in an efficient and environmentally conscientious way.

DETAILED DESCRIPTION

The following disclosure describes various embodiments of systems and methods that can enable consumers to purchase "new" mobile phones and, if the consumer desires, sell their "old" mobile phone. For example, in some embodiments a kiosk or system of kiosks configured in accordance with the present technology can enable users to sell a damaged or broken phone, purchase a new phone, and then transfer data from the old phone to the new phone. In other similar embodiments, users can purchase a new phone, transfer data from an old phone to the new phone, and then sell the old phone. In some embodiments, the user may also have the option of applying the proceeds from the sale of the old phone toward the cost of the new phone. Such systems can also enable users to sell their old mobile phones without having to buy a new phone, and/or to purchase new phones without selling an old phone. In general, as used herein the term "old" does not necessarily mean that a phone is chronologically old, outdated, damaged, etc., but only that the phone is one that the owner wishes to sell and/or replace with a new phone. Similarly, the term "new" phone is not limited to phones that are brand new, but can also include phones that have been recycled and refurbished for resale.

Certain details are set forth in the following description and in FIGS. 1A-9 to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1A.

Figure 1A:
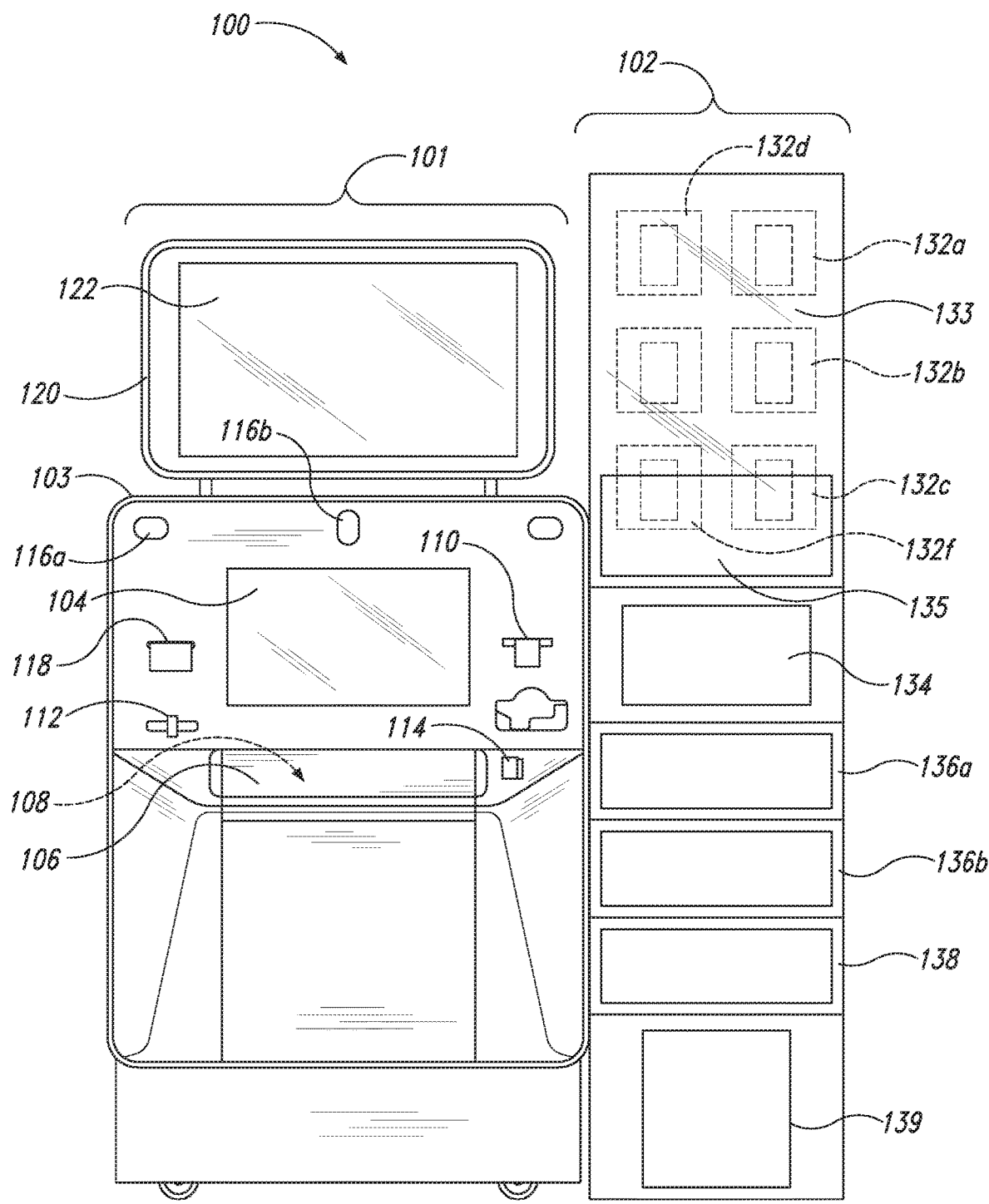
FIG. 1A is a front view of a kiosk for purchasing and/or vending mobile phones and/or other electronic devices, configured in accordance with embodiments of the present technology.

FIG. 1A is a front view of a kiosk 100 for purchasing or recycling mobile phones and other electronic devices from consumers, selling (e.g., vending) mobile phones and other electronic devices to consumers, and/or performing other processes and transactions associated with such devices, in accordance with embodiments of the present technology. The term "recycling" is used herein for ease of reference to generally refer to purchasing, reselling, exchanging, donating, etc. mobile phones and other electronic devices. For example, owners may elect to sell their used electronic devices at the kiosk 100, and the electronic devices can be recycled for resale, reconditioning, repair, recovery of salvageable components, environmentally conscious disposal, etc. Unless otherwise specified the term "processing" is used herein for ease of reference to generally refer to all manner of services and operations that may be performed or facilitated by the kiosk 100 on, with, or otherwise in relation to an electronic device. Such services and operations can include, for example, identifying, evaluating, pricing, auctioning, decommissioning, transferring data from or to, cleaning, reconfiguring, refurbishing, changing carriers, facilitating insurance transactions, etc.

Although many embodiments of the present technology are described herein in the context of mobile phones, aspects of the present technology are not limited to mobile phones and generally apply to other consumer electronic devices. Such devices include, as non-limiting examples, all manner of mobile phones; smartphones; handheld devices; personal digital assistants (PDAs); MP3 or other digital music players; tablet, notebook, ultrabook and laptop computers; e-readers all types of cameras GPS devices; set-top boxes; universal remote controls; wearable computers; etc. In some embodiments, it is contemplated that the kiosk 100 can facilitate selling and/or otherwise processing larger consumer electronic devices, such as desktop computers, TVs, game consoles, etc., as well smaller electronic devices such as Google® Glass™, smartwatches (e.g., the Apple Watch Android Wear devices such as the Moto 360®, or the Pebble Steel™ watch), etc. Embodiments of the kiosk 100 and various features thereof can be at least generally similar in structure and function to the systems, methods and corresponding features described in the following patents and patent applications, which are incorporated herein by reference in their entireties: U.S. Pat. Nos. 10,496,963; 10,475,002; 10,445,708; 10,438,174; 10,417,615; 10,401,411; 10,269,110; 10,157,427; 10,127,647; 10,055,798; 10,032,140; 9,911,102; 9,904,911; 9,885,672; 9,881,284; 9,818,160; 8,463,646; 8,423,404; 8,239,262; 8,200,533; 8,195,511; and 7,881,965; U.S. patent application Ser. Nos. 12/573,089; 12/727,624; 13/113,497; 12/785,465; 13/017,560; 13/438,924; 13/753,539; 13/658,825; 13/733,984; 13/705,252; 13/487,299; 13/492,835; 13/562,292; 13/658,828; 13/693,032; 13/792,030; 13/794,814; 13/794,816; 13/862,395; 13/913,408; 14/498,763; 14/500,739; 14/873,158; 14/506,449; 14/925,357; 14/925,375; 14/934,134; 14/964,963; 14/568,051; 14/966,346; 14/598,469; 14/660,768; 14/663,331; 15/057,707; 15/091,487; 15/214,791; 15/630,460; 15/641,145; 15/672,157; 15/855,320; 15/901,526; 15/977,729; 16/195,785; 16/357,041; 16/534,741; 16/556,018; 16/556,104; 16/575,003; 16/575,090; and 16/601,492; U.S. Provisional Application No. 62/169,072, titled "METHODS AND SYSTEMS FOR VISUALLY EVALUATING ELECTRONIC DEVICES," filed by the applicant on Jun. 1, 2015; U.S. Provisional Application No. 62/202,330, titled "METHODS AND SYSTEMS FOR INSPECTING MOBILE DEVICES AND OTHER CONSUMER ELECTRONIC DEVICES WITH ROBOTIC ACTUATION," filed by the applicant on Aug. 7, 2015; U.S. Provisional Application No. 62/332,736, titled "METHODS AND SYSTEMS FOR DETECTING DAMAGE IN EDGE REGIONS OF MOBILE ELECTRONIC DEVICES," filed by the applicant on May 6, 2016; U.S. Provisional Application No. 62/807,153, titled "KIOSK FOR EVALUATING AND PURCHASING USED ELECTRONIC DEVICES," filed by the applicant on Feb. 18, 2019; U.S. Provisional Application No. 62/804,714, titled "CONNECTOR CARRIER FOR ELECTRONIC DEVICE KIOSK," filed by the applicant on Feb. 12, 2019; and U.S. Provisional Application No. 62/807,165, titled "NEURAL NETWORK BASED PHYSICAL CONDITION EVALUATION OF ELECTRONIC DEVICES, AND ASSOCIATED SYSTEMS AND METHODS," filed by the applicant on Feb. 18, 2019. All the patents and patent applications listed in the preceding sentence and any other patents or patent applications identified herein are incorporated herein by reference in their entireties.

In the illustrated embodiment, the kiosk 100 includes a first kiosk portion 101 for purchasing and/or recycling mobile phones and/or other electronic devices received from users, and a second kiosk portion 102 for selling (e.g., vending) such devices to users. In some embodiments, the first kiosk portion 101 and the second kiosk portion 102 can have separate housings placed in close proximity to each other and/or physically attached to each other (as shown in FIG. 1A), or they can be spaced apart from each other as separate kiosks that can either be used separately or in conjunction with each other. In other embodiments, the first kiosk portion 101 and the second kiosk portion 102 can be integrated into a single unit or housing (as described below with reference to FIG. 2).

The first kiosk portion 101 can be at least generally similar in structure and function to one or more of the kiosks described in detail in the patents and applications incorporated herein by reference in their entirety. For example, in the illustrated embodiment the first kiosk portion 101 is a floor-standing self-service machine configured for use by a user (e.g., a consumer, customer, etc.) to recycle, sell, and/or perform other operations with a mobile phone or other consumer electronic device. In other embodiments, the kiosk portion 101 can be configured for use on a countertop or a similar raised surface. Although the first kiosk portion 101 is configured for use by consumers, in various embodiments the kiosk portion 101 and/or various portions thereof can also be used by other operators, such as a retail clerk or kiosk assistant to facilitate the selling or other processing of mobile phones and other electronic devices.

In the illustrated embodiment, the first kiosk portion 101 includes a housing 103 that is approximately the size of a conventional vending machine. The housing 103 can be of conventional manufacture from, for example, sheet metal, plastic panels, etc. A plurality of user interface devices are provided on a front portion of the housing 103 for providing instructions and other information to users, and/or for receiving user inputs and other information from users. For example, the kiosk portion 101 can include a display screen 104 (e.g., a liquid crystal display (LCD) or light emitting diode (LED) display screen, a projected display (such as a heads-up display or a head-mounted device), GUI, and so on) for providing information, prompts, etc. to users. The display screen 104 can include a touch screen for receiving user input and responses to displayed prompts. In addition or alternatively, the kiosk portion 101 can include a separate keyboard or keypad for this purpose. The kiosk portion 101 can also include an ID reader or scanner 112 (e.g., a driver's license scanner), a fingerprint reader 114, and one or more cameras 116 (e.g., digital still and/or video cameras, identified individually as cameras 116a-b). The kiosk portion 101 can additionally include output devices such as a label printer having an outlet 110, and a cash dispenser having an outlet 118. Although not identified in FIG. 1A, the kiosk portion 101 can further include a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), a receipt or voucher printer and dispenser, as well as other user input and output devices. The input devices may include a touchpad, a pointing device such as a mouse, a joystick, pen, game pad, motion sensor, scanner, eye direction monitoring system, etc. Additionally, the first kiosk portion 101 can also include a bar code reader (for reading, e.g., a bar code displayed on a mobile device), QR code reader (for reading, e.g., a OR displayed on a mobile device), bag/package dispenser, a digital signature pad, etc.

In the illustrated embodiment, the kiosk portion 101 additionally includes a header 120 having a display screen 122 for displaying marketing advertisements and/or other video or graphical information to attract users to the kiosk 100. In addition to the user interface devices described above, the front portion of the housing 103 also includes an access panel or door 106 located directly beneath the display screen 104. As described in greater detail below, the access door 106 is configured to automatically retract so that the user can place an electronic device (e.g., a mobile phone) in an inspection area 108 for automatic inspection by the first kiosk portion 101.

A sidewall portion of the housing 103 (e.g., the sidewall opposite the second kiosk portion 102) can include a number of conveniences to help users recycle or otherwise process their mobile phones. For example, in the illustrated embodiment the sidewall can carry an accessory bin that is configured to receive mobile device accessories that the user wishes to recycle or otherwise dispose of. Additionally, the sidewall can provide a free charging station with a plurality of electrical connectors for charging a wide variety of mobile phones and other consumer electronic devices.

Figure 1C:
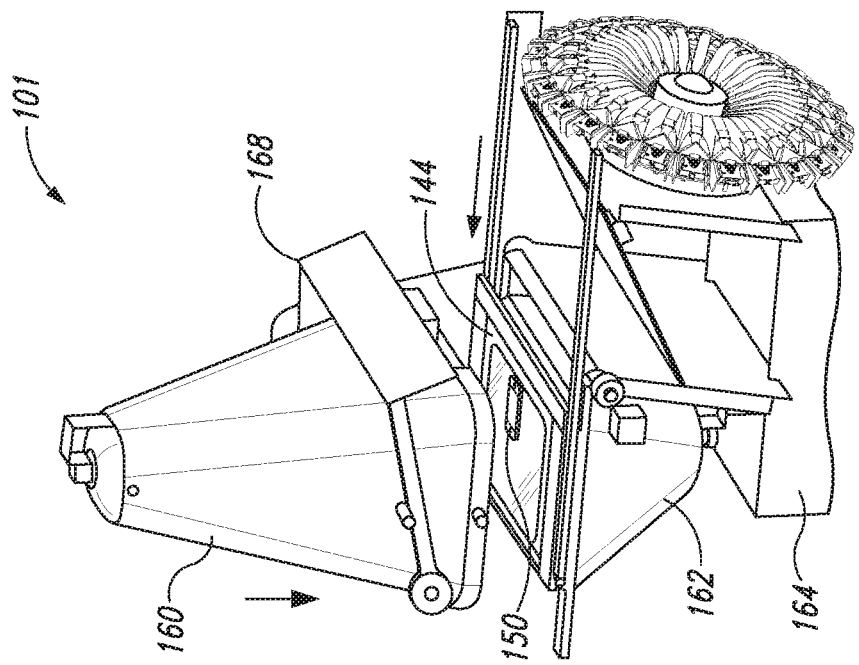
FIGS. 1B-1E are a series of isometric views of a portion of the kiosk of FIG. 1A with a number of exterior panels removed to illustrate operation in accordance with embodiments of the present technology.
Figure 1B:
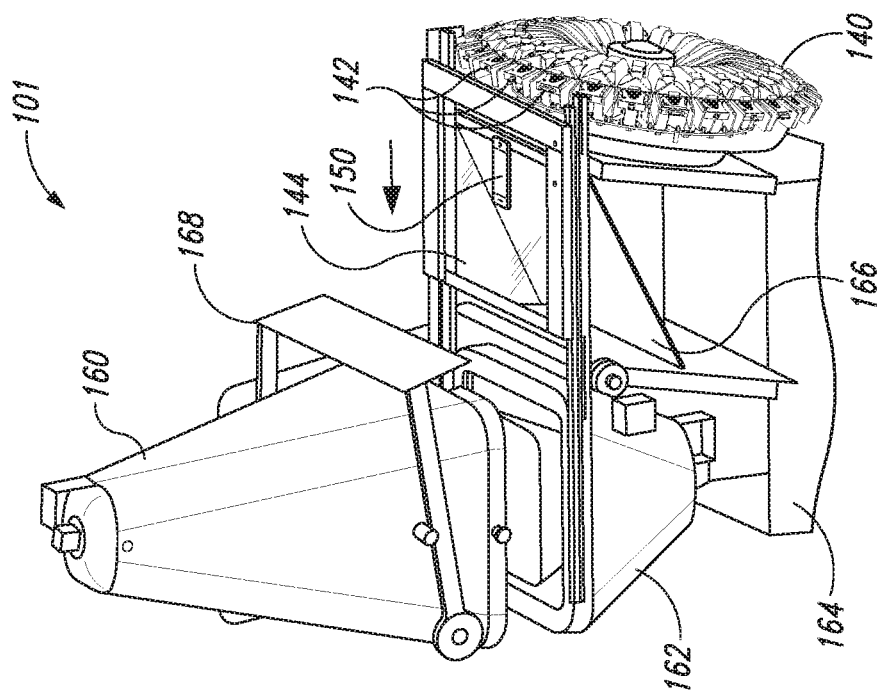

FIGS. 1B-1E are a series of isometric views of the first kiosk portion 101 with the housing 103 removed to illustrate selected internal components of the first kiosk portion 101 configured in accordance with an embodiment of the present technology. Referring first to FIG. 1B, in the illustrated embodiment the first kiosk portion 101 includes a connector carrier 140 and an inspection plate 144 operably disposed behind the access door 106 (FIG. 1A). In the illustrated embodiment, the connector carrier 140 is a rotatable carrousel that is configured to rotate about a generally horizontal, center axis and carries a plurality of electrical connectors 142 (e.g., approximately 25 connectors) distributed around an outer periphery thereof. In other embodiments, other types of connector carrying devices (including both fixed and linearly movable arrangements) can be used. In some embodiments, the connectors 142 can include a plurality of interchangeable USB connectors configured to provide power and/or exchange data with a variety of different mobile phones and/or other electronic devices. In operation, the carrousel 140 is configured to automatically rotate about its axis to position an appropriate one of the connectors 142 adjacent to an electronic device, such as a mobile phone 150, that has been placed on the inspection plate 144 for recycling. The connector 142 can then be manually and/or automatically withdrawn from the carousel 140 and connected to a port on the mobile phone 150 for electrical analysis. Such analysis can include, e.g., an evaluation of make, model, configuration, condition, etc. using one or more of the methods and/or systems described in detail in the commonly owned patents and patent applications identified herein and incorporated by reference in their entireties.

In the illustrated embodiment, the inspection plate 144 is configured to translate back and forth (on, e.g., parallel mounting tracks) to move an electronic device, such as the mobile phone 150, between a first position directly behind the access door 106 and a second position between an upper chamber 160 and an opposing lower chamber 162. Moreover, in this embodiment the inspection plate 144 is transparent, or at least partially transparent (e.g., formed of glass, Plexiglas, etc.) to enable the mobile phone 150 to be photographed and/or otherwise optically evaluated from all, or at least most viewing angles (e.g., top, bottom, sides, etc.) using, e.g., one or more cameras, mirrors, etc. mounted to or otherwise associated with the upper and lower chambers 160 and 162, respectively. When the mobile phone 150 is in the second position, the upper chamber 160 can translate downwardly to generally enclose the mobile phone 150 between the upper chamber 160 and the lower chamber 162. The upper chamber 160 is operably coupled to a gate 168 that moves up and down in unison with the upper chamber 160. As noted above, in the illustrated embodiment the upper chamber 160 and/or the lower chamber 162 can include one or more cameras, magnification tools, scanners (e.g., bar code scanners, infrared scanners, etc.) or other imaging components (not shown) and an arrangement of mirrors (also not shown) to view, photograph and/or otherwise visually evaluate the mobile phone 150 from multiple perspectives. In some embodiments, one or more of the cameras and/or other imaging components discussed above can be movable to facilitate device evaluation. The inspection area 108 (FIG. 1A) can also include weight scales, heat detectors, UV readers/detectors, and the like for further evaluation of electronic devices placed therein. The first kiosk portion 101 can further include an angled binning plate 166 for directing electronic devices from the transparent plate 144 into a collection bin 164 positioned in a lower portion of the kiosk portion 101.

The first kiosk portion 101 can be used in a number of different ways to efficiently facilitate the recycling, selling and/or other processing of mobile phones and other consumer electronic devices. Referring to FIGS. 1A-1E together, in some embodiments a user wishing to sell a used mobile phone, such as the mobile phone 150, approaches the first kiosk portion 101 and identifies the type of device the user wishes to sell in response to textual and/or visual prompts displayed on the screen 104. Next, the user may be prompted to remove any cases, stickers, or other accessories from the device 150 so that it can be accurately evaluated. Additionally, the kiosk portion 101 may print and dispense a unique identification label (e.g., a small adhesive-backed sticker with a QR code, barcode, etc.) from the label outlet 110 for the user to adhere to the back of the mobile phone 150. After this is done, the door 106 retracts allowing the user to place the mobile phone 150 onto the transparent plate 144 in the inspection area 108 (FIG. 1B). The door 106 then closes and the transparent plate 144 moves rearwardly to move the mobile phone 150 under the upper chamber 160 as shown in FIG. 1C. The upper chamber 160 then moves downwardly to generally enclose the mobile phone 150 between the upper and lower chambers 160 and 162, and the cameras and/or other imaging components in the upper and lower chambers 160 and 162 perform a visual inspection of the mobile phone 150. In some embodiments, the visual inspection can include a 3D visual analysis to confirm the identification of the mobile phone 150 (e.g. make and model) and/or to evaluate or assess the condition and/or function of the mobile phone 150 and/or its various components and systems. For example, the visual analysis can include an inspection of a display screen on the mobile phone 150 for cracks or other damage. In some embodiments, the visual inspection can include performing optical character recognition (OCR) to identify printed or displayed patterns, codes, and/or text, and comparing characteristics of the patterns, codes, and/or text (e.g., layout, size, font, color, etc.) to templates to determine the presence of device identifiers such as a model number, serial number, etc. In some embodiments, the first kiosk portion 101 can perform the visual analysis using one or more of the methods and/or systems described in detail in the commonly owned patents and patent applications identified herein and incorporated by reference in their entireties.

Figure 1E:
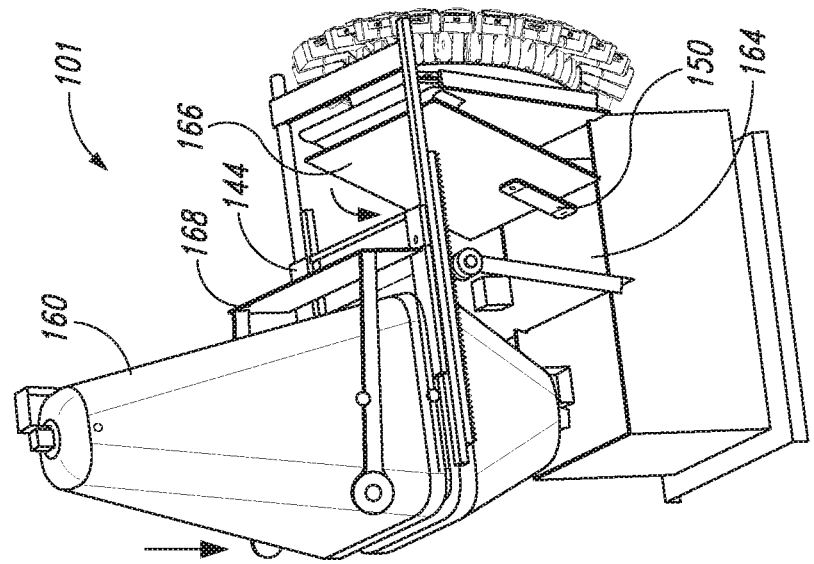
Figure 1D:
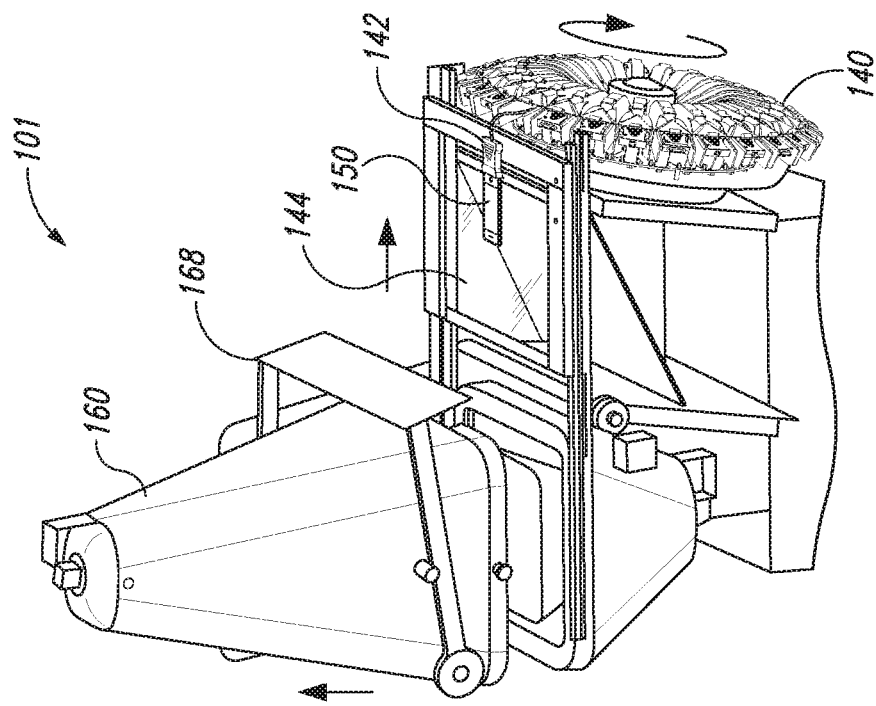

Referring next to FIG. 1D, after the visual analysis is performed and the device 150 has been identified, the upper chamber 160 returns to its upper position and the transparent plate 144 returns the mobile phone 150 to its initial position next to the door 106 (FIG. 1A). The display screen 104 can also provide an estimated price or an estimated range of prices that the kiosk portion 101 may offer the user for the mobile phone 150 based on the visual analysis and/or based on user input (e.g., input regarding the type, condition, etc. of the mobile phone 150). If the user indicates (via, e.g., input via the touch screen) that he or she wishes to proceed with the transaction, the carrousel 140 automatically rotates an appropriate one of the connectors 142 into an upper position adjacent the transparent plate 144, and door 106 is again opened. The user can then be instructed (via, e.g., the display screen 104) to withdraw the appropriate connector 142 (and its associated wire) from the carrousel 140, plug the connector 142 into the corresponding port (e.g., a USB port) on the mobile phone 150, and reposition the mobile phone 150 in the inspection area on the transparent plate 144. After doing so, the door 106 once again closes and the kiosk portion 101 performs an electrical inspection of the mobile phone 150 to identify the phone and further evaluate the condition of the phone as well as specific component and operating parameters such as memory, carrier, etc.

For example, in some embodiments the electrical inspection can obtain characteristic information about the mobile phone 150, which can include device identification, make, model, and/or configuration. In other embodiments, the characteristic information can further include device functionality including hardware/software configuration, charging capability, memory capacity, etc. Information necessary to identify and/or evaluate a mobile device can include, for example, a unique identifier (e.g., an IMEI number or an MEID or equivalent number of a mobile phone, a hardware media access control address (MAC address) of a networkable device, or a model number and serial number of the electronic device); information describing the device manufacturer (e.g., a manufacturer name or ID code), model, characteristics and capabilities (e.g., CPU type and speed, storage capacity (SRAM, DRAM, disk, etc.), wireless carrier, radio bands (frequency ranges and encodings such as CDMA, GSM, LTE, etc.), and/or color, condition; and so on. In some embodiments, the electrical analysis can include evaluating the condition and/or functionality of the charging circuit of the electronic device. In particular, the testing electronics can measure the amount of charge current that the charging circuit draws on the power lines, and the testing electronics can use the corresponding current measurement signal to determine whether the charging circuit is functional or damaged. In some embodiments, the kiosk portion 101 can perform the electrical analysis using one or more of the methods and/or systems described in detail in the commonly owned patents and patent applications identified herein and incorporated by reference in their entireties.

In some embodiments, the user can attach the electrical connector to the mobile phone 150 and/or perform an electrical analysis of the device before the kiosk portion 101 performs a visual analysis of the phone. For example, in such an embodiment the user can approach the kiosk portion 101 and identify the type of device (e.g., the make and model) he or she wishes to recycle, and/or the appropriate electrical connector for connecting to the device. The kiosk portion 101 can then use this information to stage the appropriate electrical connector at the inspection area. Alternatively, the kiosk portion 101 can present the user with a selection of standard electrical connectors from which the user can determine an appropriate electrical connector for connecting to the device. Either way, the door 106 retracts and the user is instructed to withdraw the selected connector 142 from the carrier 140, plug it into the corresponding port (e.g., a USB port) on the mobile phone 150, and position the mobile phone 150 on the transparent plate 144 in the inspection area. The user may also be prompted to remove any cases, stickers, or other accessories from the mobile phone 150, and adhere a unique identification label to the back of the mobile phone 150 as described above. The door 106 then closes and the kiosk portion 101 can perform an electrical inspection of the mobile phone 150 as described above, and after the electrical inspection, a visual inspection as described above. The electrical inspection can include gathering device identification information and/or other information, which the kiosk portion 101 can then use to customize further interaction with the user, such as to add or omit user inquiries depending on the type of device the user connects. Thus, in some embodiments, electrical inspection of the mobile phone 150 can occur before the user provides information about the mobile phone 150 to the kiosk portion 101.

After the visual and electronic analysis of the mobile phone 150, the kiosk portion 101 determines whether the evaluation is sufficient for pricing the mobile phone 150. The determination can include, for example, whether the evaluation of the phone's type and condition is sufficient to determine a price to offer for the phone or whether the phone could be in a range of possible prices. For example, to determine a price for the mobile phone 150, the kiosk portion 101 may use information about the make and model of the phone or one or more unique identifiers of the phone to look up a current price for the device in a database or pricing model. The database or pricing model can be, for example, a local lookup table of common devices and/or a remotely hosted database or web service to which the kiosk portion 101 can transmit information about the electronic device and receive a current market value or offer price for the electronic device. After a phone purchase price has been determined, the user may be presented with the price via the display screen 104. If the user declines the price (via, e.g., the touch screen), a retraction mechanism 143 automatically disconnects the connector 142 from the mobile phone 150, the door 106 opens, and the user can reach in and retrieve the mobile phone 150. If the user accepts the price, the door 106 remains closed and the purchase transaction proceeds. For example, the user may be prompted to place his or her identification (e.g., a driver's license) in the ID scanner 112 and provide a thumbprint via the fingerprint reader 114 (FIG. 1A). As a fraud prevention measure, the kiosk portion 101 can be configured to transmit an image of the driver's license to a remote computer screen, and an operator at the remote computer can visually compare the picture (and/or other information) on the driver's license to the person standing in front of the kiosk portion 101 as viewed by one or more of the cameras 116a-b (FIG. 1A) to confirm that the person attempting to sell the mobile phone 150 is in fact the person identified by the driver's license. In some embodiments, one or more of the cameras 116a-b can be movable to facilitate viewing of kiosk users, as well as other individuals in the proximity of the kiosk portion 101. Additionally, the person's fingerprint can be checked against records of known fraud perpetrators. If either of these checks indicate that the person selling the phone presents a fraud risk, the transaction can be declined and the mobile phone 150 returned to the user. Returning to FIG. 1D, after the user's identity has been verified the retraction mechanism 143 automatically disconnects the connector 142 from the mobile phone 150 and the transparent plate 144 moves back toward the upper and lower chambers 160 and 162. As shown in FIG. 1E, however, when the upper chamber 160 is in the lower position the gate 168 permits the transparent plate 144 to slide underneath but not electronic devices carried thereon. As a result, the gate 168 knocks the phone 150 off of the transparent plate 144, onto the binning plate 166 and into the bin 164. The first kiosk portion 101 can then provide payment of the purchase price to the user. In some embodiments, payment can be made in the form of cash dispensed from the cash outlet 118. In other embodiments, the user can receive remuneration for the mobile phone 150 in various other useful ways. For example, the user can be paid via a redeemable cash voucher, a coupon, an e-certificate, a prepaid card, a wired or wireless monetary deposit to an electronic account (e.g., a bank account, credit account, loyalty account, online commerce account, mobile wallet, etc.), Bitcoin, etc.

As those of ordinary skill in the art will appreciate, the foregoing routines are but some examples of ways in which the first kiosk portion 101 can be used to purchase, recycle or otherwise process consumer electronic devices such as mobile phones. Additionally, it should be understood that the configuration of the first kiosk portion 101 described above is but one example of a suitable mobile device evaluation, purchasing, and/or recycling system that can be used with embodiments of the present technology. Accordingly, other embodiments of the present technology can use other mobile device evaluation, purchasing, and/or recycling systems without departing from the present disclosure. Such systems specifically include, for example, the kiosk configurations described in detail in U.S. Provisional Application No. 62/807,153, titled KIOSK EVALUATING AND PURCHASING USED ELECTRONIC DEVICES, which was filed Feb. 18, 2019 and is incorporated herein by reference in its entirety. Although the foregoing examples are described in the context of mobile phones, it should be understood that kiosk portion 101 and various embodiments thereof can also be used in a similar manner for recycling virtually any consumer electronic device, such as MP3 players, tablet computers, laptop computers, e-readers, PDAs, Google Glass™, smartwatches, and other portable or wearable devices, as well as other relatively non-portable electronic devices such as desktop computers, printers, televisions, DVRs, devices for playing games, entertainment or other digital media on CDs, DVDs, Blu-ray, etc. Moreover, although the foregoing examples are described in the context of use by a consumer, the kiosk portion 101 in various embodiments thereof can similarly be used by others, such as store clerk, to assist consumers in recycling, selling, exchanging, etc, their electronic devices.

Although embodiments of the first kiosk portion 101 described above include establishing an electrical connection between the mobile phone 150 and the first kiosk portion 101 (and, more specifically, a central processing unit (CPU) of the kiosk portion 101) via an electrical connector, in other embodiments the first kiosk portion 101 can establish a wireless connection with the mobile phone 150 to facilitate performing all or a portion of the phone evaluation and purchase steps described above. For example, in some embodiments the first kiosk portion 101 can include a wireless radio transceiver that is accessible by user devices. The first kiosk portion 101 can establish a wireless connection with the mobile phone 150 by providing connection instructions and/or authentication information for the user to enter on the mobile phone 150 and/or the first kiosk portion 101. For example, the first kiosk portion 101 can direct the user to make the mobile phone's Bluetooth connection discoverable, and/or can provide a Bluetooth pairing code that the user can type on the screen of the phone 150 or on the touchscreen of the first kiosk portion 101. As another example, the kiosk portion 101 can provide a Wi-Fi network name and/or password that when selected and/or entered on the user's phone 150 enables the user to wirelessly connect the device to the indicated Wi-Fi network. In other embodiments, establishing the connection can include providing a visual code or image (e.g., a QR code) for the user to scan using the mobile phone 150, such that scanning the code or image prompts the phone to connect to the kiosk's wireless network (e.g., upon user confirmation). In some embodiments, establishing the connection can include allowing a particular wireless device to join or use the wireless network or make a wireless connection. For example, when the first kiosk portion 101 detects the mobile phone 150 and determines that the device is registered for access or otherwise recognized, the kiosk portion 101 automatically connects to the mobile phone 150 without requiring further user authentication. In other embodiments, the user can load a mobile app onto the mobile phone 150, and the app can evaluate the electronic device and facilitate wireless communication between the mobile phone 150 and the first kiosk portion 101 to facilitate phone evaluation and purchase by the kiosk portion 101. Various systems and methods for establishing a wireless connection between the kiosk 100 and a mobile phone or other electronic device of a user are described in at least some of the patents and/or patent applications incorporated herein by reference in their entireties. In other embodiments, wireless connections between the kiosk 100 and mobile phones and other electronic devices can be established using other suitable means known in the art.

Returning to FIG. 1A, in another aspect of this embodiment the second kiosk portion 102 includes a plurality of vending units 132a-f, a display 134, a plurality of data transfer units or compartments 136a,b, a cleaning compartment 138, and a supply compartment 139. As described in greater detail below, each of the vending units 132 can be configured to hold and vend one or more mobile phones. In some embodiments, the vending units 132a-f can be positioned behind a transparent front cover or panel 133 that is positioned above an access door 135 through which users can access purchased phones. To accommodate urban areas where retail space is at a premium, the second kiosk portion 102 can be relatively tall and narrow, and each of the vending units 132 can similarly be relatively narrow. For example, in some embodiments the individual vending units 132 can be about 3 inches wide and can carry up to six mobile phones each.

In another aspect of the illustrated embodiment, the display 134 can be positioned below the vending units 132 to comply with ADA requirements, and can include, for example, a display screen for displaying graphical and textual prompts to users to facilitate use of the second kiosk portion 102. Additionally, the display 134 can also include, for example, a touch screen for receiving user input and responses to display prompts. The second kiosk portion 102 can further include a key pad and/or other user input devices (e.g., fingerprint reader(s), optical scanners, etc.) for receiving user input.

As described in further detail below, each of the data transfer compartments 136 includes means for transferring data from one mobile phone (e.g., an old mobile phone that a user wishes to sell via the first kiosk portion 101) to another mobile phone (e.g., a new mobile phone). The second kiosk portion 102 can include two or more data transfer compartments 136 so that multiple users can use the second kiosk portion 102 to transfer data at the same time. In some embodiments, the cleaning compartment 138 can include an ultraviolet light source and/or other devices for cleaning mobile phones. In some embodiments, the supply compartment 139 can carry supplies that a user may access to facilitate a purchase or sale of a mobile phone. For example, in some embodiments the supply compartment 139 can include a plurality of pre-addressed shipping pouches that users can use to securely send their phone (e.g., an old mobile phone) to an operator of the system 100 for evaluation and sale.

Figure 2:
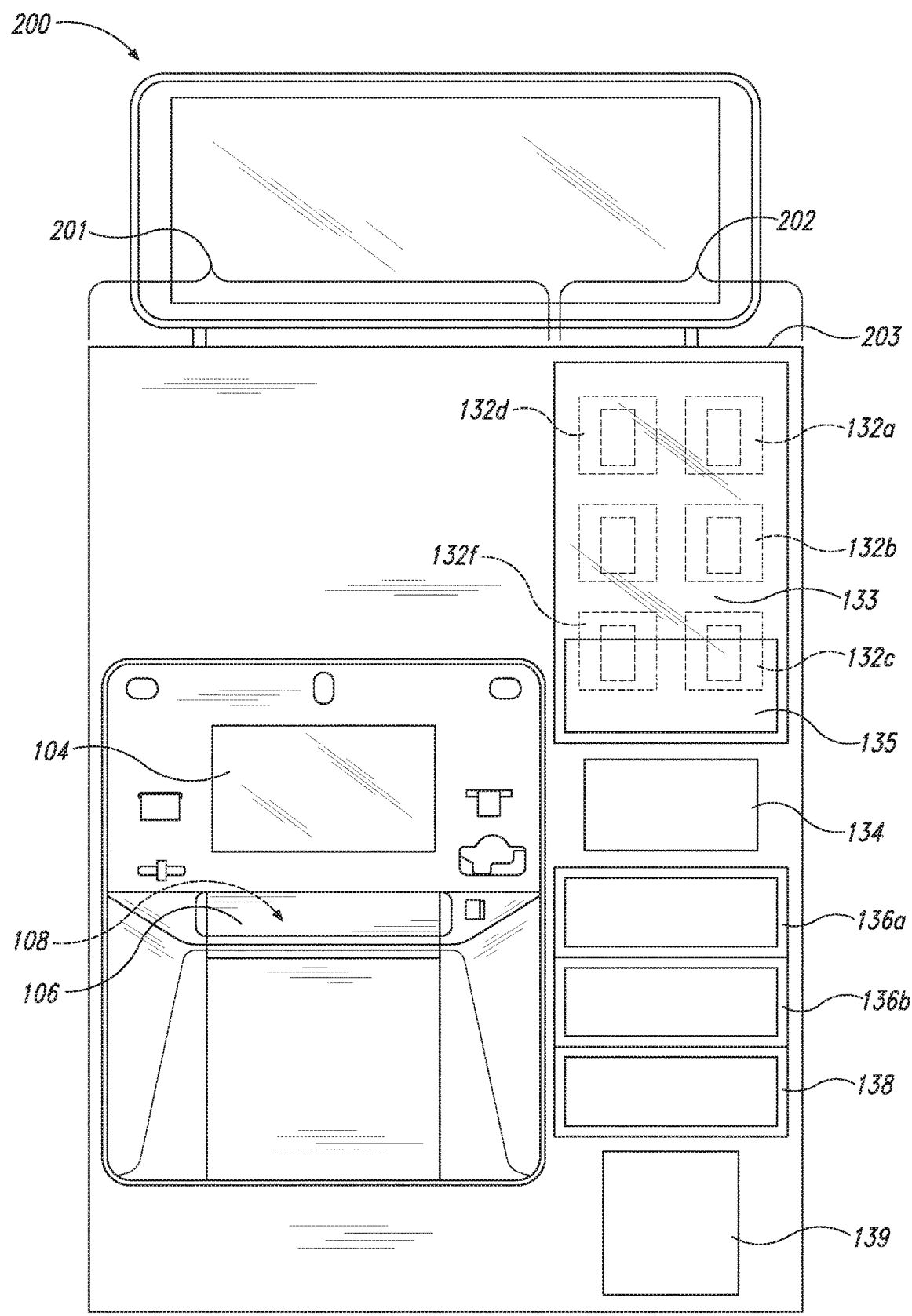
FIG. 2 is a front view of a kiosk for purchasing and/or vending mobile phones and/or other electronic devices, configured in accordance with other embodiments of the present technology.

FIG. 2 is a front view of a kiosk 200 for purchasing or recycling "old" mobile phones and other electronic devices from consumers, selling (e.g., vending) "new" devices to consumers, and/or performing other processes associated with such devices and transactions, in accordance with other embodiments of the present technology. In some embodiments, the kiosk 200 is essentially the same in structure and function as the kiosk 100 described above with reference to FIG. 1A, except that the first kiosk portion 101 and the second kiosk portion 102 are integrated into a single housing 203. Accordingly, in some embodiments the kiosk 200 can include a first kiosk portion 201 having all, or at least substantially all, of the functionality provided by the first kiosk portion 101 of the kiosk 100, and a second kiosk portion 202 having all, or at least substantially all, of the functionality provided by the second kiosk portion 102 of the kiosk 100.

For example, a plurality of user interface devices can be provided on a front portion of the housing 203 for providing instructions and other information to users, and/or for receiving user inputs and other information from users. For example, the first kiosk portion 201 can include a display screen 104 (e.g., a liquid crystal display (LCD), etc.) for providing information, prompts, etc. to users to facilitate use of the first kiosk portion 201. The display screen 204 can include a touch screen for receiving user input and responses to displayed prompts. The first kiosk portion 201 can further include an ID reader or scanner (e.g., a driver's license scanner), a fingerprint reader, and one or more cameras (e.g., digital still and/or video cameras), that are at least generally similar in structure and function to the scanner 112, fingerprint reader 114, and cameras 116 described in detail above with reference to FIG. 1A. Similarly, the first kiosk portion 201 can also include output devices such as a label printer, a cash dispenser, and/or other functionality described above with reference to FIG. 1A to facilitate purchasing a mobile phone from a user. In addition to the user interface devices described above, the first kiosk portion 201 also includes an access panel or door 106 located directly beneath the display screen 104. As described in detail above with reference to FIGS. 1A-1E, the access door 106 is configured to automatically retract (open) so that the user can place electronic device in an inspection area 108 for automatic inspection by the kiosk 200. As will be clear from the foregoing discussion, the first kiosk portion 201 can include all, or at least substantially all, of the apparatus, structures, and functions the first kiosk portion 101 includes for purchasing a phone from a user as described above with reference to FIGS. 1A-1E.

Turning next to the second kiosk portion 202, in some embodiments this portion of the kiosk 200 can include all, or at least substantially all, of the structures and functions provided by the second kiosk portion 102 described above with reference to FIG. 1A. For example, this portion of the kiosk 200 can include a plurality of vending units 132a-f and a display 134 (e.g., a GUI), that are at least generally similar in structure and function, or the same in structure and function, as the vending units 132a-f and the display 134, respectively, described in detail above with reference to FIG. 1A. Additionally, the second kiosk portion 202 can further include one or more data transfer compartments 136a,b and a cleaning compartment 138 that are at least generally similar in structure and function, or identical, to the data transfer compartment 136 and the cleaning compartment 138, respectively, described in detail above with reference to FIG. 1A.

Figure 3:
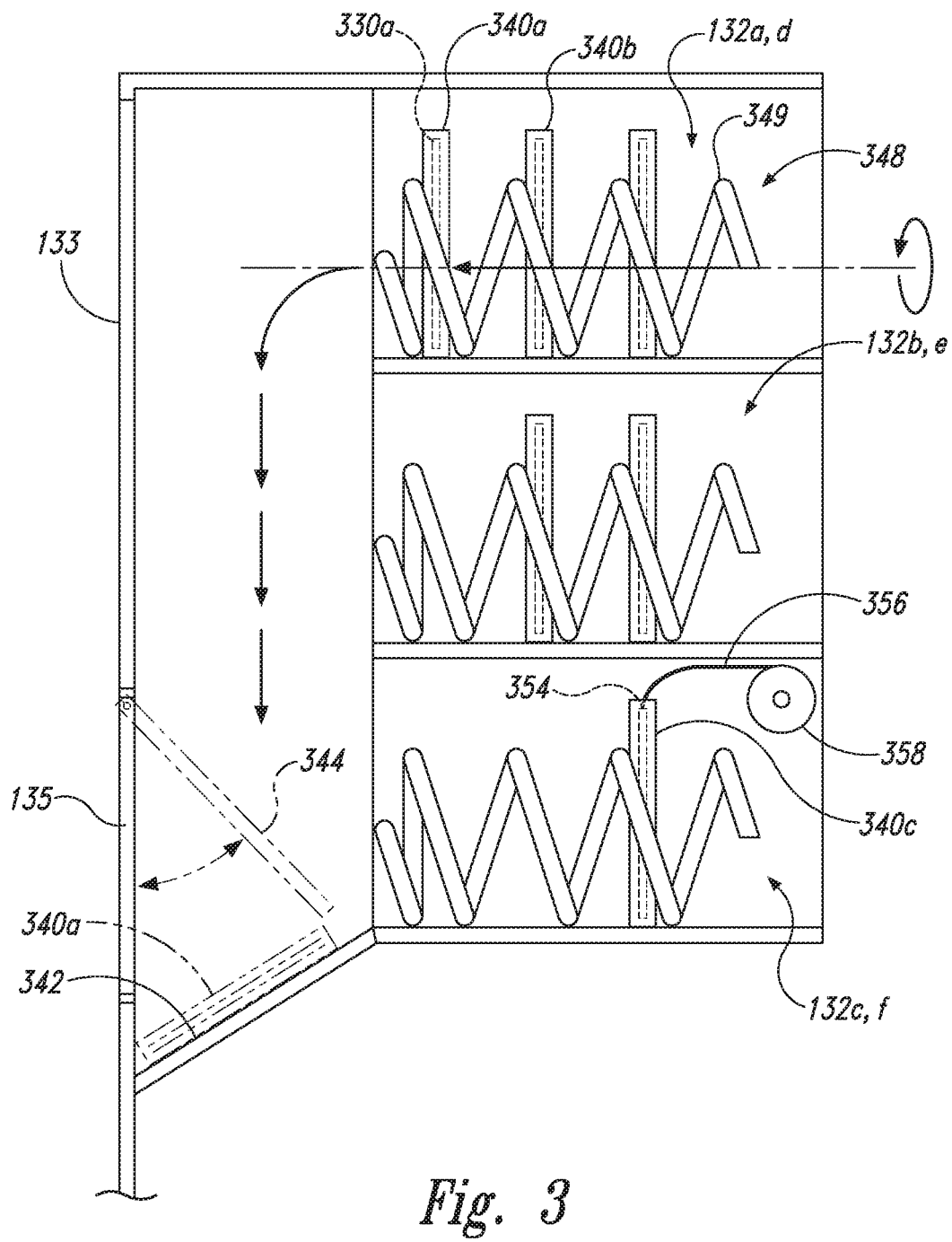
FIG. 3 is an enlarged, partially schematic side view of an electronic device vending apparatus configured in accordance with embodiments of the present technology.

FIG. 3 is an enlarged, partially schematic side view of a plurality of the vending units 132 configured in accordance with embodiments of the present technology. Each of the vending units 132 can be at least generally similar in structure and function, and each can include a dispensing apparatus 348. In the illustrated embodiment, the dispensing apparatus 348 includes a rotatable dispenser 349 operably coupled to a drive mechanism (e.g., an electric motor; not shown). The dispenser 349 is in the shape of a horizontally oriented coil or helix member that is rotatably supported on a proximal end and supports a plurality of product packages 340. Each of the product packages 340a-f carries a corresponding mobile phone 330a-f and, in some embodiments, ancillary equipment such as a recharging cable, SIM card tool, etc. In some embodiments, the phones 330 can be used phones that have been purchased from prior owners and processed for resale (e.g., personal data erased from memory) and/or brand-new phones. In some embodiments, the front cover 133 of the vending units 132 can be formed from plexiglass or some other transparent material that enables users to view the product packages 340 and see which mobile phones are available from the kiosk at any given time. In operation, the drive mechanism rotates the dispenser 349 about the longitudinal axis to advance the product packages 340 forward in response to user selections. When a selected product package 340 (e.g., the package 340a) gets to the end of the corresponding vending unit slot, it falls into an outlet tray 342. The user can then push the access door 135 inwardly as shown by the dashed lines in FIG. 3 to retrieve the product package 340a. In other embodiments, other types of suitable conveyor devices known in the art can be used to selectively vend the product packages 340. Such devices can include, for example, conveyor belts, robot arms, etc. Additionally, in some embodiments the last product package 340 in each vending unit can be an empty package that never gets vended. This way customers will always see what appear to be "products" in the kiosk, instead of empty spaces.

As described in greater detail below with reference to FIG. 6, in some embodiments each of the vending units 132 can include one or more cable carriers 358 carrying one or more electrical cables 356. Each of the cables 356 can include a corresponding connector 354 that connects to one of the mobile phones 330 in its respective product package 340. As described in greater detail below, providing an electrical connection to each of the mobile phones 330 in the dispensing units 132 can enable the kiosk 100, 200 described above to effect a data transfer between a user's old phone and a newly selected phone 330 (e.g., the phone 330f) while the newly selected phone 330 is still held within the corresponding dispensing unit 132 and the old phone is contained in, for example, the inspection area 108 of the first kiosk portion 101, 201 and connected to the electrical connector 142. In some embodiments, the cable carriers 358 can include, e.g., spring-loaded and/or electromechanically driven spools and/or other devices configured to retract the cables 356 and/or otherwise unplug the connectors 354 from the respective phones 330 just prior to the phones being dispensed, and/or during the dispensing process.

Figure 4:
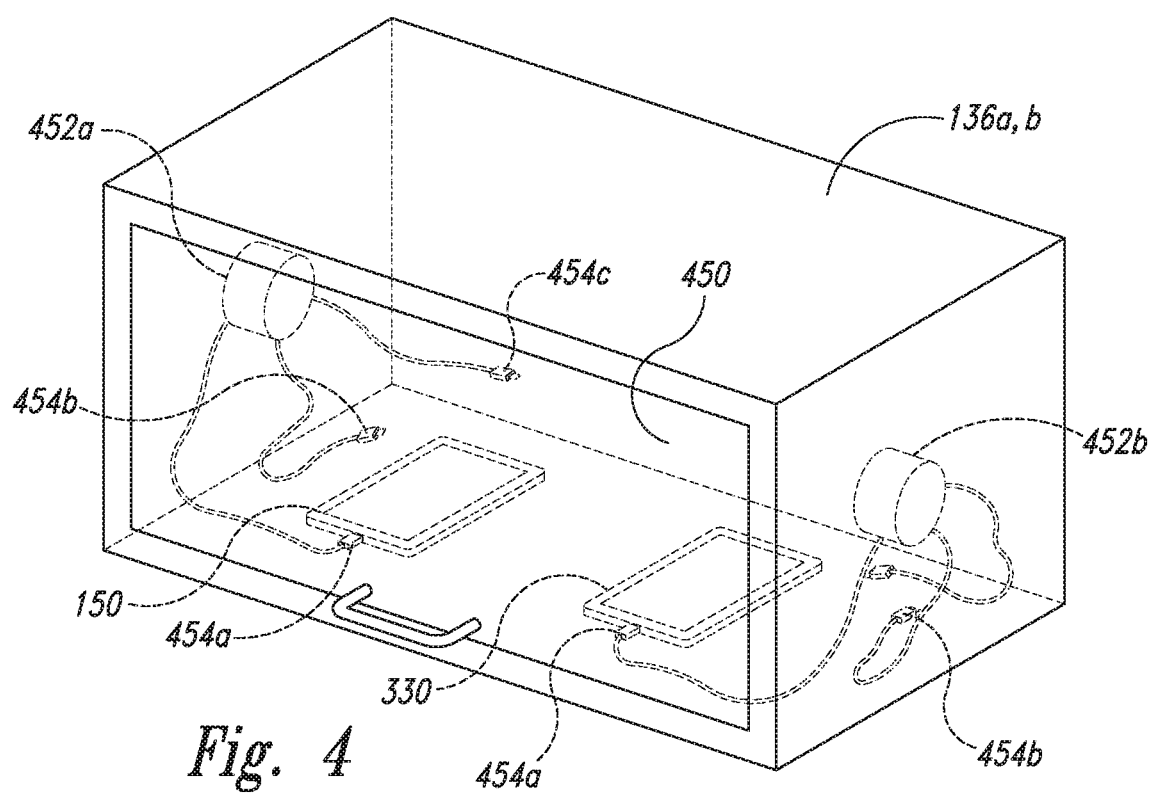
FIG. 4 is an enlarged, partially schematic isometric view of an electronic device data transfer apparatus configured in accordance with embodiments of the present technology.

FIG. 4 is an enlarged, partially schematic isometric view of one of the data transfer compartments 136 configured in accordance with embodiments of the present technology. In the illustrated embodiment, the data transfer compartment 136 can include a lockable door 450 that, when opened (with, e.g., an appropriate code), enables a user to place two or more mobile phones in the interior of the compartment. For example, in the illustrated embodiment the data transfer compartment 136 contains a new mobile phone 330 that the user purchased via one of the vending units 132, and an old mobile phone 150 (e.g., a mobile phone the user wishes to sell via the first kiosk portion 101, 201). The interior of the data transfer compartment 136 can include a first connector head 452a and a second connector head 452b. Each of the connector heads 452 can carry a plurality of electrical cables having corresponding connectors 454a-c. For example, in some embodiments each of the connector heads 452 can carry connectors suitable for connecting to each of the commercially available types of mobile phones, such as iPhones, Android phones, etc.

To transfer data from the old phone 150 to the new phone 330, the user opens the door 450 and positions the old phone 150 inside the data transfer compartment 136 and connects it to the appropriate cable connector 454. The user then does the same with the new phone 330 and closes the door 450. As described in greater detail below, the user then initiates the data transfer process by inputting (via, e.g., the display 134) appropriate selections (e.g., selections of data the user wishes to transfer to the new phone 330, such as contacts, photos, apps, etc.) via the display 134 of the second kiosk portion 102, 202, and the door 450 is automatically locked with a suitable mechanism (not shown). The user can then define or be given (via, e.g., the display 134) a unique code that must be entered (via, e.g., the display 134) before the user can reopen the door 450 and remove the devices. After locking the door, the second kiosk portion processor transfers selected data (e.g., contacts, photos, settings, applications, etc.) from the old phone 150 to the new phone 330 (and/or deletes/erases selected data from the old phone 150) using data transfer methods known in the art and/or described in one or more of the patents and/or applications incorporated herein by reference in their entirety. For example, in some embodiments the kiosk processor can be configured to transfer the data directly from the old phone 150 to the new phone 330, or to a temporary storage device, to Cloud storage, etc., and then to the new phone 330. In some embodiments, the user may also manually transfer their SIM card from the old phone 150 to the new phone 330. Additionally, rather than use physical connectors (e.g., the connectors 454) to effect data transfer between the old phone 150 and the new phone 330, in other embodiments the data transfer can be performed via wireless connections between one or both of the phones 150 or 330 and, e.g., the kiosk processor.

In some embodiments, data can also be erased from the mobile phone 150. For example, a kiosk processor can be configured to instruct the mobile phone 150 to erase all personal data (e.g., photos, contacts, etc.) from the phone. Other data, such as operating software for the phone, is not erased. If the data is to be transferred to a remote database for storage, a kiosk processor can be configured to transfer the data from the mobile phone 150, through the kiosk 100, 200, and over a network to a server for storage in a database for eventual retrieval by the owner of the device for, e.g., downloading to a new device. Once the data transfer is complete, the user can input the unique code to open the door 450 and retrieve the phones.

Figure 5:
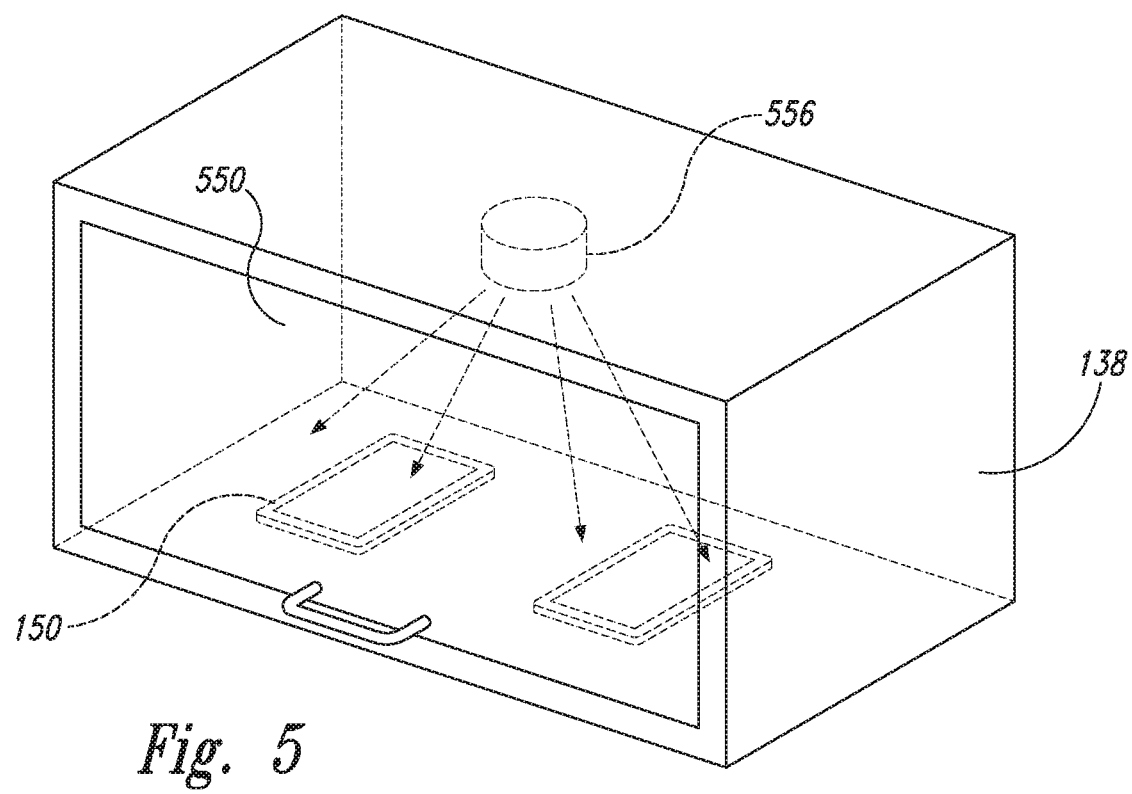
FIG. 5 is an enlarged, partially schematic isometric view of an electronic device cleaning apparatus configured in accordance with embodiments of the present technology.

FIG. 5 is an enlarged, partially schematic isometric view of the cleaning compartment 138 of the second kiosk portion 102, 202 described above. In the illustrated embodiment, the cleaning compartment 138 includes an interior portion having one or more ultraviolet (UV) light sources 556. To clean an old phone 150, the user can open the door 550 and place the old phone inside the cleaning compartment 138. The user can then start the cleaning process by pressing an appropriate button or similar manual control adjacent the cleaning compartment 138, or an icon on the display 134, which turns the UV light source 556 on to clean the phone 150. After a sufficient period of time and the phone is clean, the UV light source 556 turns off and an audible or visual signal can let the user know that they can retrieve the phone 150 from the cleaning compartment 138.

Figure 6:
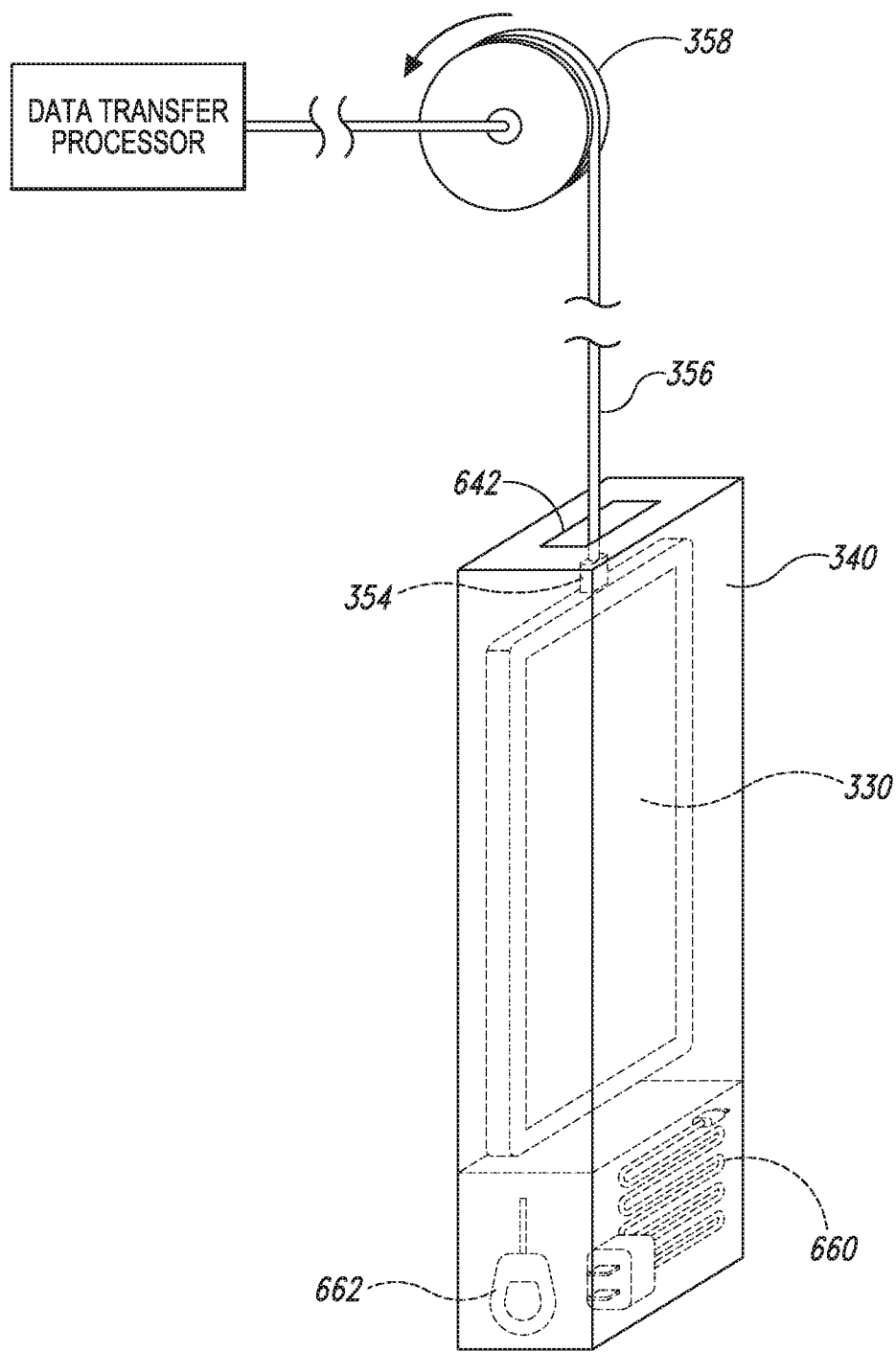
FIG. 6 is an enlarged, partially schematic isometric view of an electronic device in a vending package configured in accordance with embodiments of the present technology.

FIG. 6 is an enlarged, partially schematic isometric view of the product package 340 configured as it would be when contained within one of the vending units 132 described above with reference to FIG. 3. In the illustrated embodiment, the product package 340 can be a paper (e.g., cardboard) box configured to enclose a mobile phone 330 and having an opening 642 through which the cable 356 can be connected to the mobile phone 330. As described above, providing an electrical connection between the second kiosk portion 102, 202 and the mobile phone 330 while the mobile phone 330 is in the vending unit 132 enables the kiosk to transfer data from, for example, an old phone to the mobile device 330 after it has been selected and paid for by the user, but before it has been dispensed to the user. In other embodiments, the cable connection can also enable the kiosk to keep the phone 330 charged, and/or to load other data, applications, etc. onto the phone 330 before it is dispensed to a customer. In another aspect of this embodiment, the product package 340 can include a compartment that contains ancillary equipment for use with the mobile phone 330. Such equipment can include, for example, a recharging cable 660 and/or a SIM card removal tool 662, etc.

Figure 7:
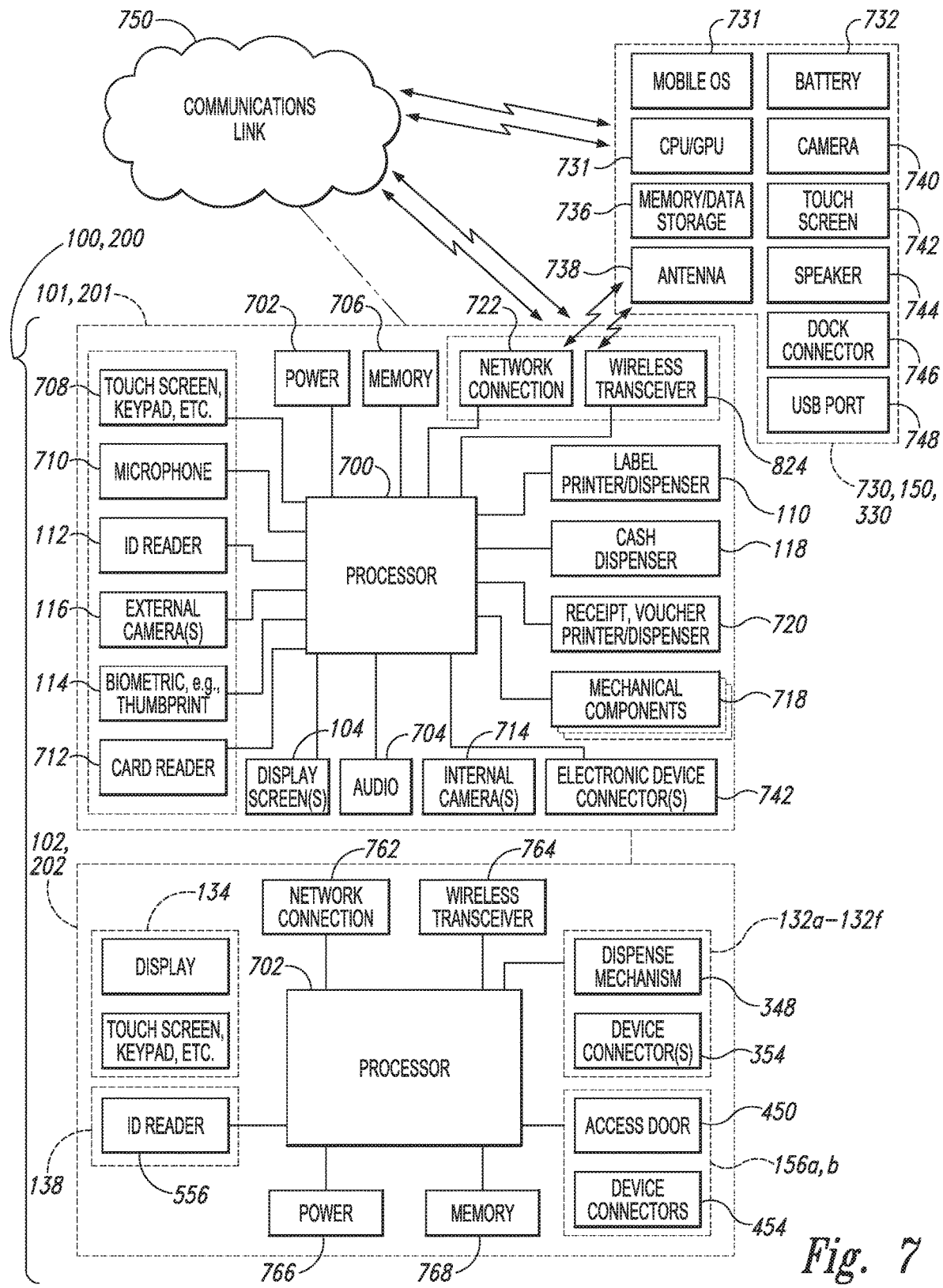
FIG. 7 is a schematic diagram illustrating various components associated with the systems of FIGS. 1A and 2.

FIG. 7 provides a schematic representation of an architecture of the kiosk 100, 200 in accordance with embodiments of the present technology. In the illustrated embodiment, the first kiosk portion 101, 201 includes a suitable processor or central processing unit (CPU) 700 that controls operation of the first kiosk portion 101, 201 as described above in accordance with computer-readable instructions stored on system memory 706. The CPU 700 may be any logic processing unit, such as one or more CPUs, digital signal processors (DSPs), application-specific integrated circuits (ASICs), etc. The CPU 700 may be a single processing unit or multiple processing units in an electronic device or distributed across multiple devices. The CPU 700 is connected to the memory 706 and may be coupled to other hardware devices, for example, with the use of a bus (e.g., a PCI Express or Serial ATA bus). The CPU 700 can include, by way of example, a standard personal computer (PC) (e.g., a DELL® OptiPlex® 7010 PC) or other type of embedded computer running any suitable operating system, such as Windows®, Linux®, Android™, iOS®, or an embedded real-time operating system. In some embodiments, the CPU 700 can be a small form factor PC with integrated hard disk drive (HDD) or solid-state drive (SSD) and universal serial bus (USB) or other ports to communicate with the other components of the kiosk portion 101. In other embodiments, the CPU 700 can include a microprocessor with a standalone motherboard that interfaces with a separate HDD. The memory 706 can include read-only memory (ROM) and random access memory (RAM) or other storage devices, such as disk drives or SSDs, that store the executable applications, test software, databases and other software required to, for example, control kiosk components, process electronic device information and data (to, e.g., evaluate device make, model, condition, pricing, etc.), communicate and exchange data and information with remote computers and other devices, etc.

The CPU 700 can provide information and instructions to kiosk users via the display screen 104 and/or an audio system (e.g., a speaker) 704. The CPU 700 can also receive user inputs via, e.g., a touch screen 708 associated with the display screen 104, a keypad with physical keys, and/or a microphone 710. Additionally, the CPU 700 can receive personal identification and/or biometric information associated with users via the ID reader 112, one or more of the external cameras 116, and/or the fingerprint reader 114. In some embodiments, the CPU 700 can also receive information (such as user identification and/or account information) via a card reader 712 (e.g., a debit, credit, or loyalty card reader having, e.g., a suitable magnetic stripe reader, optical reader, etc.). The CPU 700 can also control operation of the label dispenser 110 and systems for providing remuneration to users, such as the cash dispenser 118 and/or a receipt or voucher printer and an associated dispenser 720.

As noted above, the first kiosk portion 101, 201 additionally includes a number of electronic, optical and electromechanical devices for electrically, visually and/or physically analyzing electronic devices placed therein for recycling. Such systems can include one more internal cameras 714 for visually inspecting electronic devices for, e.g., determining external dimensions and condition, and one or more of the electrical connectors 142 (e.g., USB connectors) for, e.g., powering up electronic devices and performing electronic analyses. As noted above, the cameras 714 can be operably coupled to the upper and lower chambers 160 and 162, and the connectors 142 can be movably and interchangeably carried by the carrousel 140 (FIGS. 1B-1E). The first kiosk portion 101, 201 further includes a plurality of mechanical components that are electronically actuated for carrying out the various functions of the kiosk portion 101, 201 during operation. The mechanical components 718 can include, for example, the inspection area access door 106 and one or more of the movable components (e.g. the inspection plate 144, the upper and lower chambers 160 and 162, etc.) operably disposed within the inspection area 108 (FIG. 1A). The kiosk portion 101 further includes power 702, which can include battery power and/or facility power for operation of the various electrical components associated with kiosk operation.

In the illustrated embodiment, the first kiosk portion 101, 201 further includes a network connection 722 (e.g., a wired connection, such as an Ethernet port, cable modem, FireWire cable, Lightning connector, USB port, etc.) suitable for communication with, e.g., all manner of processing devices (including remote processing devices) via a communication link 750, and a wireless transceiver 724 (e.g., including a Wi-Fi access point; Bluetooth transceiver; near-field communication (NFC) device; wireless modem or cellular radio utilizing GSM, CDMA, 3G and/or 4G technologies; etc.) suitable for communication with, e.g., all manner of processing devices (including remote processing devices) via the communication link 750 and/or directly via, e.g., a wireless peer-to-peer connection. For example, the wireless transceiver 724 can facilitate wireless communication with electronic devices, such as an electronic device 730 (and/or the mobile devices 150 and 330) either in the proximity of the kiosk portion 101, 201 or remote therefrom. In the illustrated embodiment, the electronic device 730 is depicted as a handheld device, e.g., a mobile phone. In other embodiments, however, the electronic device 730 can be other types of electronic devices including, for example, other handheld devices; PDAs; MP3 players; tablet, notebook and laptop computers; e-readers; cameras; desktop computers; TVs; DVRs; game consoles; Google Glass™; smartwatches; etc. By way of example only, in the illustrated embodiment the electronic device 730 can include one or more features, applications and/or other elements commonly found in smartphones and other known mobile devices. For example, the electronic device 730 can include a CPU and/or a graphics processing unit (GPU) 734 for executing computer readable instructions stored on memory 736. In addition, the electronic device 730 can include an internal power source or battery 732, a dock connector 746, a USB port 748, a camera 740, and/or well-known input devices, including, for example, a touch screen 742, a keypad, etc. In many embodiments, the electronic device 730 can also include a speaker 744 for two-way communication and audio playback. In addition to the foregoing features, the electronic device 730 can include an operating system (OS) 731 and/or a device wireless transceiver that may include one or more antennas 738 for wirelessly communicating with, for example, other electronic devices, websites, and the first kiosk portion 101, 201. Such communication can be performed via, e.g., the communication link 750 (which can include the Internet, a public or private intranet, a local or extended Wi-Fi network, cell towers, the plain old telephone system (POTS), etc.), direct wireless communication, etc.

In the illustrated embodiment, the second kiosk portion 102, 202 can include a suitable processor or CPU 701 that controls operation of the second kiosk portion 102, 202 as described above in accordance with computer readable instructions stored on system memory 768. The CPU 701 may be a single processing unit or multiple processing units in an electronic device or distributed across multiple devices. In some embodiments, the CPU 701 and the CPU 700 can be operably connected to each other to perform the various methods described herein, exchange data and information, share processing tasks, etc. In other embodiments, the processors 701 and 700 can be combined into a single processing device. The CPU 701 can provide information and instructions to kiosk users via the display 134. The processor 701 can also be operably connected to and control operation of the dispense mechanism 348 (e.g., the dispenser drive mechanism), the cable carriers 358, and the device connectors 354 in the vending units 132; the data transfer system, device connectors 454, and the access door 450 of the data transfer compartments 136; and the UV light source 556 in the cleaning compartment 138. In some embodiments, the second kiosk portion 102, 202 can further include a network connection 762 (e.g., a wired connection, such as an Ethernet port, cable modem, etc.) suitable for communication with e.g., the first kiosk portion 101, 201, and all manner of other processing devices via, e.g., the communication link 750. Additionally, the second kiosk portion 102, 202 can further include a wireless transceiver 764 (e.g., a Wi-Fi access point; Bluetooth transceiver; near-field communication (NFC) device, etc.) suitable for communication with, e.g., all manner of processing devices (including remote processing devices) via the communication link 750 and/or directly via e.g., a wireless peer-to-peer connection.

Unless described otherwise, the construction and operation of the various components shown in FIG. 7 are of conventional design. As a result, such components need not be described in further detail herein, as they will be readily understood by those skilled in the relevant art. In other embodiments, the first kiosk portion 101, 201 and/or the electronic device 730 (150, 330) can include other features that may be different from those described above. In still further embodiments, the first kiosk portion 101, 201 and/or the electronic device 730 (150, 330) can include more or fewer features similar to those described above.

Figure 8A:
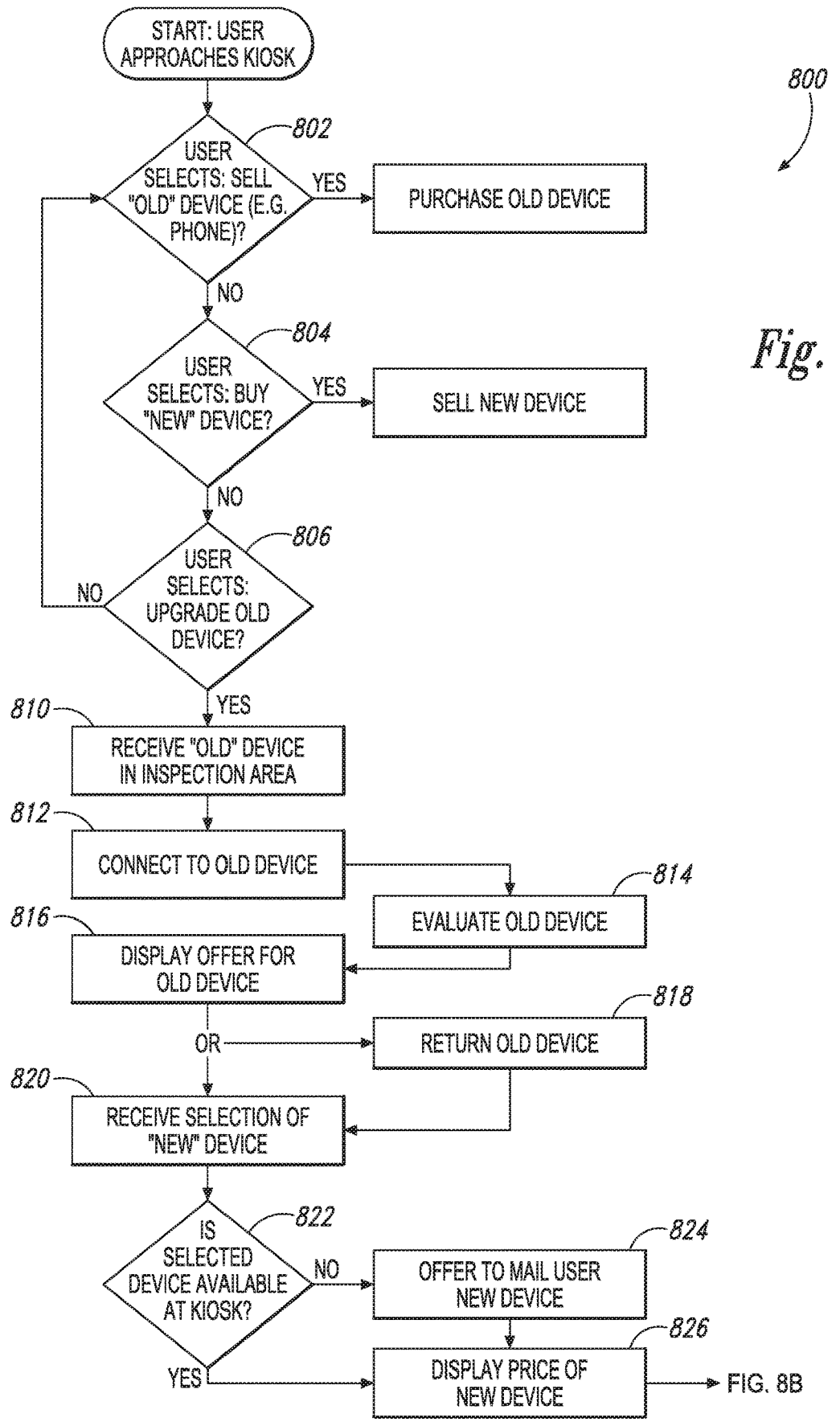
FIGS. 8A and 8B illustrate a flow routine for purchasing an electronic device from a user and selling another electronic device to the user in accordance with embodiments of the present technology.
Figure 8B:
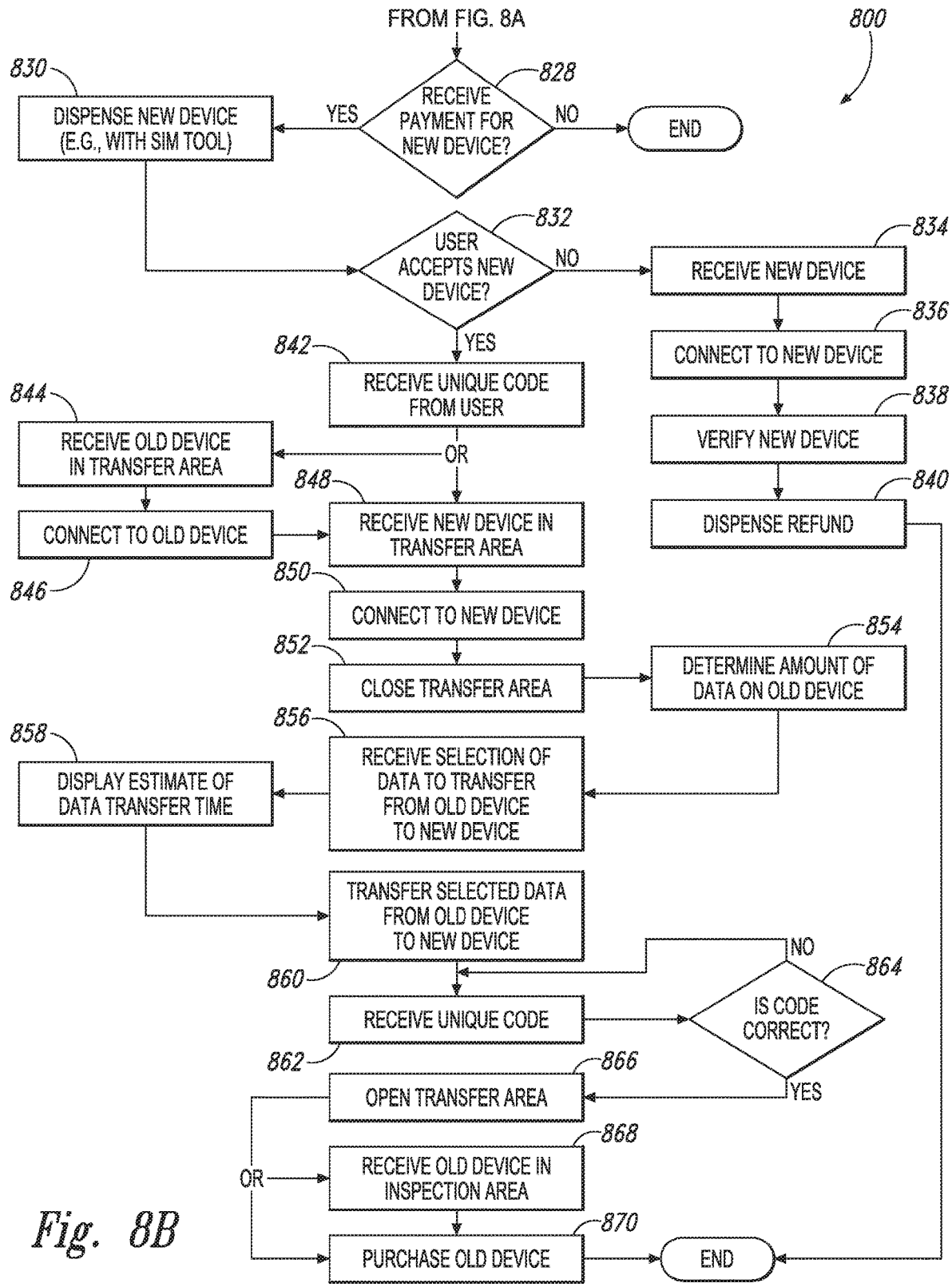

FIGS. 8A and 8B are flow diagrams of a routine 800 for operating the kiosk 100, 200 in accordance with embodiments of the present technology. In some embodiments, all or portions of the routine 800 can be performed by the processor 700 and/or the processor 701 described above with reference to FIG. 7, in accordance with computer-readable instructions stored on the memory 706 and/or the memory 768. Referring first to FIG. 8A, the routine begins when a user approaches the kiosk and selects a desired transaction. For example, the user may approach the kiosk 100, 200 and indicate (via, e.g., interactions with the display 104) that the user wishes to sell an electronic device that the user currently owns (e.g., a mobile phone), and/or the user may indicate that they wish to purchase a new device.

In decision block 802, the routine determines if the user wishes to sell their old device. If so, then the first kiosk portion 101, 201 proceeds to receive, evaluate and purchase the old device from the user as described in detail above with reference to, e.g., FIGS. 1A-1E. If the user does not wish to just sell their old device, the routine proceeds to decision block 804 and determines if the user wishes to just buy a new device. If so, the second kiosk portion 102, 202 can vend a selected mobile phone to the user as described in more detail below. If the user does not wish to only buy a new device, the routine proceeds to decision block 806 to determine if the user instead wishes to upgrade an old device by selling the old device and purchasing a new device via the kiosk.

If the user does not select one of the available options, the routine returns to decision block 802 and repeats. Conversely, if the user wishes to sell their current phone and purchase a new one, the routine proceeds to block 810 and receives the old device from the user in the inspection area 108 of the first kiosk portion 101, 201. In block 812, the kiosk establishes a digital connection to the old device via, e.g., a wireless connection or a cable connection, and then evaluates the old device in block 814. After the device has been evaluated for make, model, functionality, and/or condition, etc., the routine proceeds to block 816 and the kiosk displays an offer for the old device via, e.g., the display screen 104. If the user rejects the offer or otherwise indicates that they do not wish to continue with the transaction, the routine returns the old device to the user and the routine ends. In some embodiments, the kiosk functions associated with blocks 810, 812, 814 and 816 can be substantially equivalent to the corresponding kiosk functions described in detail above with reference to FIGS. 1A-1E.

In some embodiments, after the kiosk portion 101, 201 makes the user an offer for their old phone, the kiosk portion 101, 201 can also make a recommendation to the user as to which new phone the user should purchase. For example, if the first kiosk portion 101, 201 determines (e.g., using one or more of the internal cameras, a cable, and/or a wireless connection) that the old phone is a 32 GB black iPhone 7, the first kiosk portion 101, 201 might suggest that the use purchase a 32 GB black and gray iPhone 8 and/or an iPhone 8 plus (or iPhone 10, 11, etc.) from the second kiosk portion 102, 202. Additionally, if the first kiosk portion 101, 201 determines that the user has, for example, 45 GB of photos and videos stored on their old device, the first kiosk portion 101, 201 could suggest to the user to purchase a new phone with 64 GB storage space, versus a phone with 512 GB. In some embodiments, after presenting a purchase offer to the user for the old device and receiving an indication of acceptance or a desire to otherwise proceed with the transaction, the routine can proceed to block 818 and return the old device to the user for further operations as described below. In other embodiments as described below, the first kiosk portion 101, 201 can retain the user's old device and proceed to block 820.

In block 820, the routine receives a selection from the user of a new device the user wishes to purchase from the second kiosk portion 102, 202. For example, the kiosk may present a list of available mobile phones and associated prices, specifications, etc. on the display 134, and the user can select a desired phone via the associated touch screen. Alternatively, the user may simply view the contents of the dispensing units 132 to determine if a desired make and model of phone is available, and if so, make an appropriate selection via the touch screen. Alternatively, in other embodiments the user can use their mobile phone or other web-enabled device to check the inventory of mobile phones available at the different kiosks in the network of kiosks. That way, the user can confirm that a particular kiosk 100, 200 has the phone they want before making a trip to the kiosk. In further embodiments, if a particular kiosk does not have a desired phone in inventory, it can refer the user to the closest kiosk in the network that does have the desired phone.

In decision block 822, the routine determines if the selected device is available in one of the dispensing units 132 (FIGS. 1A, 2 and 3). If not, the routine proceeds to block 824 and offers (e.g., via the display 104 or 134) to mail the user the selected phone. If the user declines the offer to receive the new phone by mail, the routine ends. If not, the routine continues to block 826 and displays the price of the new phone to the user via, e.g., the display 134 of the second kiosk portion 102, 202.

Turning next to FIG. 8B, in decision block 828 the routine determines if the kiosk has received payment from the user for the new mobile phone. In some embodiments, for example, the user can pay for the new mobile phone via a cash acceptor and/or a credit/debit card acceptor on the first kiosk portion 101, 201 and/or the second kiosk portion 102, 202. If the kiosk is unable to confirm that payment for the new device has been received, the routine ends. Alternatively, if payment is confirmed the routine proceeds to block 830 and the second kiosk portion 102, 202 dispenses the new mobile phone to the user via the corresponding vending unit 132.

After receiving the new device, the user can remove it from its product package 340 (FIGS. 3 and 6) and inspect the device. By "new" device it should be understood that in some embodiments the new device may actually be a used device that was purchased from a previous owner or other source and refurbished or repaired for resale. Accordingly, the user may wish to inspect the new device to make sure that they find it acceptable. In decision block 832, the routine determines if the user accepts the new device via, e.g., an appropriate user input via the touch screen on the display 134. If not, the routine proceeds to block 834 and receives the new device back from the user. For example, if the user decides not to accept the new device, the user can place the new device in the inspection area 108 of the first kiosk portion 101, 201 and connect it to the first kiosk portion 101, 201 via a cable connector or suitable wireless connection, as shown in block 836. In block 838, once the returned device has been suitably connected, the routine verifies that the new returned device is in fact the same device that was previously dispensed to the user. If so, the routine proceeds to block 840 and dispenses a refund to the user. It should be understood that "dispensing" a refund includes initiating a credit or other form of electronic payment and does not necessarily require that a tangible form of payment (e.g., cash or a redeemable voucher) be dispensed from the kiosk. After block 840, the routine ends.

Returning to decision block 832, if the user accepts the new device the routine proceeds to block 842 and receives a unique code from the user. The unique code can be, for example, a unique four-digit code that the user provides the kiosk for subsequent use by the user to identify themselves to the kiosk to, for example, access the data transfer compartment 136 and retrieve their new phone. After block 842, the routine can proceed in one of two ways. In a first embodiment, if the old phone was returned to the user in block 818 after it was evaluated and priced by the first kiosk portion 101, 201, then the routine can proceed to block 844 and receive the old phone from the user in one of the data transfer compartments 136 of the second kiosk portion 102, 202. In block 846, after placing the old mobile phone in the transfer compartment 136, the user connects the old phone to the appropriate cable connector 454, as shown in FIG. 4. In a second embodiment, if the user's old phone was retained in the inspection area 108 of the first kiosk portion 101, 201 (and connected to the appropriate connector 142) after block 816, the routine proceeds directly from block 842 to block 848 and receives only the new device in the data transfer compartment 136. In block 850, the user connects the new device to the appropriate cable connector 454 as shown in FIG. 4, and the routine proceeds to block 852 and closes and locks the door 450 on the data transfer compartment 136.

In block 854, the routine determines the amount of data stored on the old device. The amount of data can be determined by the first kiosk portion 101, 201 when the old device is in the inspection area 108, or by the second kiosk portion 102, 202 if the old device has been positioned in the data transfer compartment 136. The type and size of this data can be communicated to the user via the display 134, and in block 856 the user can select which of this data (e.g., contacts, photos, etc.) the user wishes to have transferred from their old device to their new device. Once the kiosk 100, 200 receives this information, the kiosk can determine or estimate the amount of time it will take to transfer the data and display the time estimate to the user in block 858. For example, if it will take approximately two hours for the kiosk to complete the data transfer, the kiosk can inform the user of this and suggest that the user instead backup the desired files from their old phone at home, and then return to the kiosk when their old phone is clean to avoid having to wait. If instead the user elects to wait while the data is transferred, the routine proceeds to block 860 and transfers the selected data from the old device to the new device via the respective kiosk connections. Once the data transfer is complete, the kiosk can notify the user by either displaying a message on the display 134, and/or by sending the user a text, email, and/or other electronic message via, e-mail, text, etc. to the mobile device of a friend or another processing device of the user to inform them that the data transfer is complete.

As described above, the kiosk 100, 200 can transfer data from an old device to a new device in at least two different ways. In one method the user retrieves their old device from the first kiosk portion 101, 102 after it has been evaluated and priced, and then places the old device in the data transfer compartment 136 along with the new device and connects the two devices as described above. The data transfer between the two devices then occurs via the data transfer compartment 136. In the other method described above, the first kiosk portion 101, 201 retains the old device and the data transfer occurs between the old device in the inspection area 108 of the first kiosk portion 101, 201 and the new device positioned in the data transfer compartment 136 of the second kiosk portion 102, 202.

In other embodiments, the first kiosk portion 101, 201 can inform the user how long it will take to transfer their data from the old phone to a new phone before the user purchases a new phone from the second kiosk portion 102, 202. For example, returning to block 814, when the old phone is in the inspection area 108 and connected to the first kiosk portion 101, 201 (via, e.g. a wireless connection or a wired connector), the first kiosk portion 101, 201 can query the old phone for the types and sizes of data stored thereon, and display the required backup times to the user via the display 104. By way of example only, in one embodiment the kiosk can display this information as follows:

a. Backup Contacts: 3 min
 b. Backup Photos: 1:15 hours
 c. Backup Videos: 1:21 hours
 d. Total Backup Time: 2:39 hours By informing the user of backup times in this manner before they buy a new phone, the user can decide what data to transfer and whether they have the time to wait at the kiosk 100, 200 for the backup to be performed. If not, the user can go home, to their office, etc, and backup the data themselves, and then return to the kiosk and purchase a new phone without having to wait to have their data backed up. This can prevent the user from being caught off guard if they were expecting to purchase a new phone and then be on their way, only to learn that they have to wait around for their data to transfer after they purchased the new phone.

In another embodiment, to save time the user may opt to do a partial backup of the data on their old phone (e.g., one or more of the smaller files, such as contacts) while at the kiosk 100, 200, and then backup larger files (e.g., photos, videos, etc.) at home or at another location later. Alternatively, if the user is selling their old phone at the kiosk 100, 200, the user may opt to backup larger files at home or at another location prior to visiting the kiosk, and then backup other data (e.g., one or more of the smaller files) while at the kiosk 100, 200. In these embodiments, the smaller files or file (e.g., contacts) from the old phone are pushed to a database (e.g., a remote database, such as Cloud storage, hard disk, etc.) by, e.g., the first kiosk portion 101, 201 when the old phone is being evaluated, or by the second kiosk portion 102, 202 via one of the data transfer compartments 136. The user then purchases a new phone via the second kiosk portion 102, 202, and runs a pre-loaded application program ("app") installed on the new phone to automatically retrieve the contacts or other "small" data from the database and load it onto the new phone.

Figure 10A:
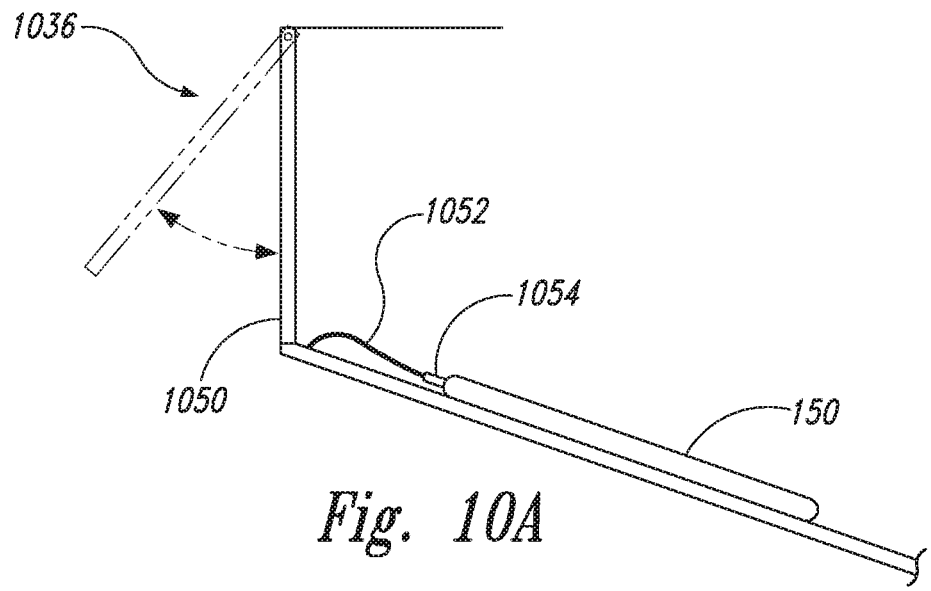
FIGS. 10A and 10B are partially schematic side views of an electronic device data transfer compartment configured in accordance with other embodiments of the present technology.
Figure 10B:
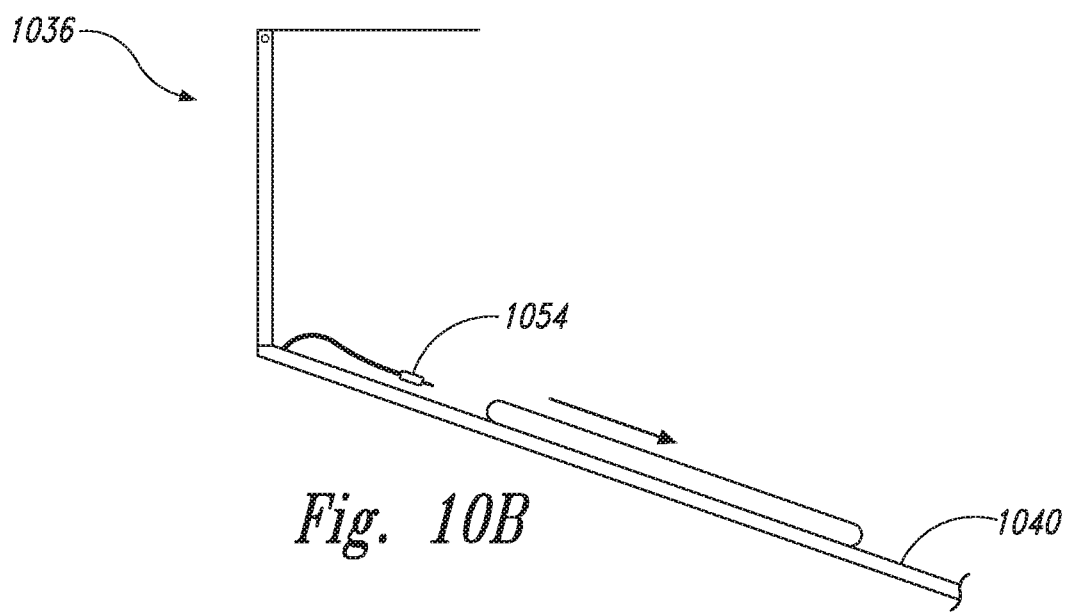
Figure 10C:
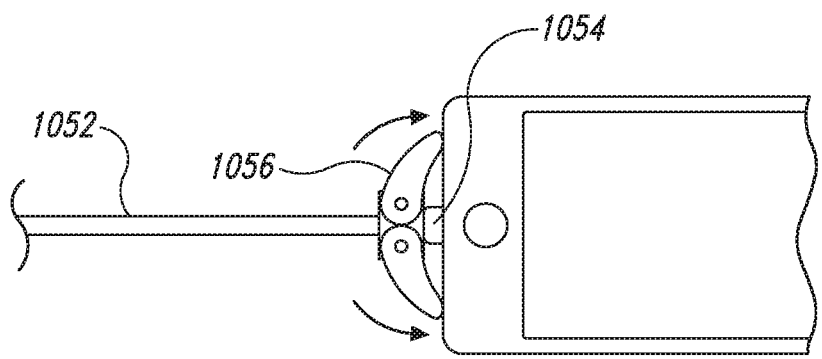
FIG. 10C is a partially schematic top view of an electrical connector disengagement device configured in accordance with a further embodiment of the present technology.

Turning momentarily to FIGS. 10A and 10B, these figures are partially schematic side views of a data transfer compartment (or "locker") 1036 configured in accordance with another embodiment of the present technology, and FIG. 10C is a partially schematic top view of an electrical connector disengagement device 1056 configured in accordance with a further embodiment of the present technology. In some embodiments, the kiosk 100, 200 can include the data transfer compartment 1036 for transferring large data files from an old phone to a new phone in an efficient manner. The data transfer compartment 1036 can include a plurality of cables 1052 with corresponding connectors 1054 (e.g., at least one connector for each type of phone connector receptacle) and/or wireless connection devices for connecting the old phone (e.g., the mobile phone 150) to the second kiosk portion 102, 202. (In other embodiments, there can be multiple such data transfer compartments 1036, each having a connector or connectors 1054 configured for one type of phone/connector receptacle.) The user connects the appropriate cable connector 1054 to the old phone 150, places the old phone 150 in the corresponding data transfer compartment 1036, and closes a door 1050 which is on the front side of the second kiosk portion 102, 202 and accessible to the user. The user can then leave the kiosk 100, 200, and the second kiosk portion 102, 202 will push the larger data files (e.g., the files other than contacts) to the database. When the backup to the database is complete, the old phone 150 can be left in the transfer compartment 1036 until it is retrieved by kiosk service personnel or, in some embodiments, by the user.

Alternatively, in other embodiments the data transfer compartment 1036 can be configured to automatically transfer old phones into an associated storage bin after the data transfer, so that the compartment can be used by another customer as soon as the data transfer is complete. For example, as shown in FIGS. 10B and 10C, in some embodiments a floor portion 1040 of each data transfer compartment 1036 can be sloped to form a chute, and an end portion of the cable 1052 can include a disengagement device 1056 that includes two pivotable pushing elements. After the data transfer is complete, the device 1056 can be commanded to pivot the pushing elements inwardly, thereby pushing the phone 150 away from the connector 1054 and disconnecting the connector 1054 therefrom. This action also pushes the old phone 150 toward the rear of the compartment so that it can slide down the chute as shown in FIG. 10B and into a storage bin (not shown). After the larger data files have been backed up in the database, the user can then be sent a text, email, or other message informing them that they can now run the preloaded app again to download the larger files to their new phone.

Returning to FIG. 8B, regardless of the particular way that data is transferred from the old device to the new device, after the data transfer in block 860 the routine proceeds to block 862 and receives a unique code from the user. The unique code can be the unique code that the user defined earlier to provide them with secure access to their new phone in the data transfer compartment 136. In decision block 864, the routine determines if the code is correct. If not, the routine keeps the data transfer compartment 136 locked and returns to block 862 until it receives the correct code. If the routine never receives the correct code after a preset number of tries, the kiosk can display an appropriate message to the user providing, for example, a number the user can call to resolve the issue, and the routine ends. Alternatively, if the code is correct the routine proceeds to block 866 and opens the door 450 to the data transfer compartment 136.

If the old device was positioned in the data transfer compartment 136 for the data transfer described above, then the kiosk instructs the user to return the old device to the inspection area 108 of the first kiosk portion 101, 201. In block 868, the routine receives the old device from the user in the inspection area 108. Conversely, if the user left the old device in the inspection area 108 of the first kiosk portion 101, 201 for the data transfer, then the routine bypasses block 868. Either way, in block 870 the first kiosk portion 101, 201 completes the purchase of the old device in the manner described above and provides payment to the user. In some embodiments, it should be noted that the kiosk 100, 200 can apply all or a portion of the proceeds from the sale of the user's old device as a credit toward the purchase price of the new device. After block 870, the routine ends.

Figure 9:
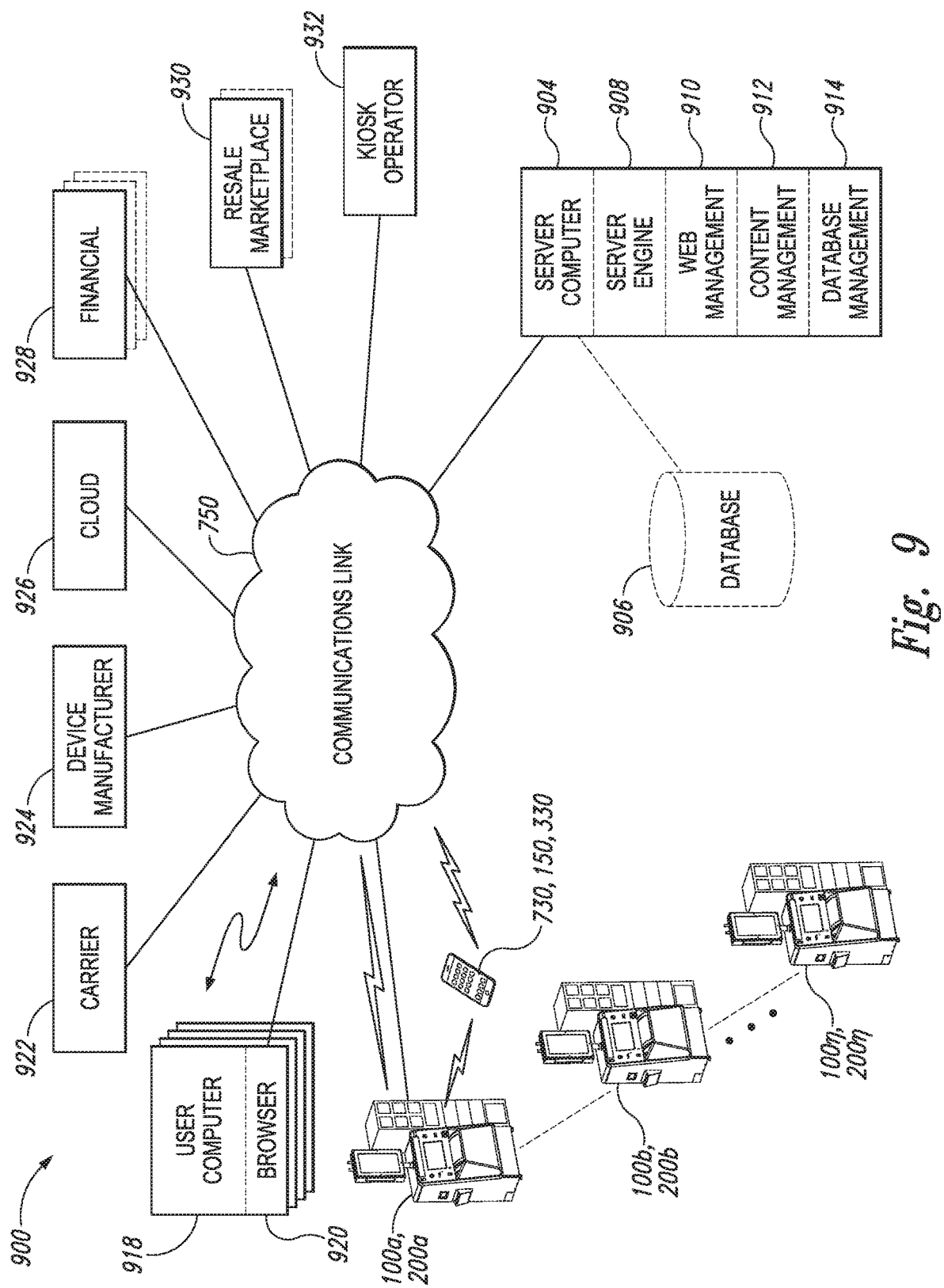
FIG. 9 is a schematic diagram of a suitable distributed computing environment for implementing various aspects of the present technology.

FIG. 9 is a schematic diagram of a suitable network environment for implementing various aspects of an electronic device recycling system 900 configured in accordance with embodiments of the present technology. In the illustrated embodiment, a plurality of the kiosks 100, 200 (identified individually as kiosks 100a, 200a-100n, 200n) can exchange information with one or more remote computers (e.g., one or more server computers 904) via the communication link 750. Although the communication link 750 can include a publicly available network (e.g., the Internet with a web interface), a private communication link, such as an intranet or other network can also be used. Moreover, in various embodiments the individual kiosks 100, 200 can be connected to a host computer (not shown) that facilitates the exchange of information between the kiosks 100, 200 and remote computers, other kiosks, mobile devices, etc.

The server computer 904 can perform many or all of the functions for receiving, routing and storing of electronic messages, such as webpages, audio signals and electronic images necessary to implement the various electronic transactions described herein. For example, the server computer 904 can retrieve and exchange web pages and other content with an associated database or databases 906. In some embodiments, the database 906 can include information related to mobile phones and/or other consumer electronic devices. Such information can include, for example, make, model, serial number, International Mobile Equipment Identity (IMEI) number, carrier plan information, pricing information, owner information, etc. In various embodiments the server computer 904 can also include a server engine 908, a web page management component 910, a content management component 912, and a database management component 914. The server engine 908 can perform the basic processing and operating system level tasks associated with the various technologies described herein. The webpage management component 910 can handle creation and/or display and/or routing of web or other display pages. The content management component 912 can handle many of the functions associated with the routines described herein. The database management component 914 can perform various storage, retrieval and query tasks associated with the database 906, and can store various information and data such as animation, graphics, visual and audio signals, etc.

In the illustrated embodiment, the kiosks 100, 200 can also be operably connected to a plurality of other remote devices and systems via the communication link 750. For example, the kiosks 100, 200 can be operably connected to a plurality of user devices 918 (e.g., personal computers, laptops, handheld devices, etc.) having associated browsers 920. Similarly, as described above the kiosks 100, 200 can each include wireless communication facilities for exchanging digital information with wireless-enabled electronic devices, such as the electronic device 730. The kiosks 100, 200 and/or the server computer 904 are also operably connectable to a series of remote computers for obtaining data and/or exchanging information with necessary service providers, financial institutions, device manufactures, authorities, government agencies, etc. For example, the kiosks 100, 200 and the server computer 904 can be operably connected to one or more cell carriers 922, one or more device manufacturers 924 (e.g., mobile phone manufacturers), one or more electronic payment or financial institutions 928, one or more databases (e.g., the GSMA IMEI Database, etc.), and one or more computers and/or other remotely located or shared resources associated with cloud computing 926. The financial institutions 928 can include all manner of entity associated with conducting financial transactions, including banks, credit/debit card facilities, online commerce facilities, online payment systems, virtual cash systems, money transfer systems, etc.

In addition to the foregoing, the kiosks 100, 200 and the server computer 904 can also be operably connected to a resale marketplace 930 and a kiosk operator 932. The resale marketplace 930 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The kiosk operator 932 can be a central computer or system of computers for controlling all manner of operation of the network of kiosks 100, 200. Such operations can include, for example, remote monitoring and facilitating of kiosk maintenance (e.g., remote testing of kiosk functionality, downloading operational software and updates, etc.), servicing (e.g., periodic replenishing of cash and other consumables), performance, etc. In addition, the kiosk operator 932 can further include one or more display screens operably connected to cameras located at each of the kiosks 100, 200 (e.g., one or more of the cameras 116 described above with reference to FIG. 1A). This remote viewing capability enables operator personnel to verify user identification and/or make other visual observations at the systems 100 in real-time during transactions, as described above with reference to FIG. 1A.

The foregoing description of the electronic device recycling system 900 illustrates but one possible network system suitable for implementing the various technologies described herein. Accordingly, those of ordinary skill in the art with appreciate that other systems consistent with the present technology can omit one or more of the facilities described in reference to FIG. 9, or can include one or more additional facilities not described in detail in FIG. 9.

The kiosks 100, 200, mobile devices 150, 330 and 730, server computers 904, user computers or devices 918, etc. can include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computers can include other program modules such as an operating system, one or more application programs (e.g., word processing or spreadsheet applications), and the like. The computers can include wireless computers, such as mobile phones, personal digital assistants (PDAs), palm-top computers, tablet computers, notebook and laptop computers desktop computers, e-readers, music players, GPS devices, wearable computers such as smartwatches and Google® Glass™, etc., that communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown, a private network, such as an intranet can likewise be used herein. The network can have a client-server architecture, in which a computer is dedicated to serving other client computers, or it can have other architectures such as peer-to-peer, in which one or more computers serve simultaneously as servers and clients. A database or databases, coupled to the server computer(s), stores much of the web pages and content exchanged between the user computers. The server computer(s), including the database(s), can employ security measures to inhibit malicious attacks on the system, and to preserve integrity of the messages and data stored therein (e.g., firewall systems, message encryption and/or authentication (e.g., using transport layer security (TLS) or secure sockets layer (SSL)), password protection schemes, encryption of stored data (e.g., using trusted computing hardware), and the like).

One skilled in the relevant art will appreciate that the concepts of the invention can be used in various environments other than location based or the Internet. In general, a display description can be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, can be used instead of the Internet. The system can be conducted within a single computer environment, rather than a client/server environment. Also, the user computers can comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Those of ordinary skill in the art will appreciate that the routines and other functions and methods described herein can be implemented as an application specific integrated circuit (ASIC), by a digital signal processing (DSP) integrated circuit, through conventional programmed logic arrays and/or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. The data storage devices can include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a transitory propagating signal per se.

The present technology allows devices of various types that can run or be evaluated by a software application, such as mobile phones (smartphones and feature phones, for example), tablet computers, wearable computers, game devices, media players, laptop and desktop computers, etc. (e.g., the device 150) to be evaluated to facilitate purchasing by an automated kiosk portion 101. The present technology enables the user to submit information about the electronic device and/or the user, obtain a price quote for the electronic device, prepare the electronic device for recycling, assist the user with bringing the electronic device to the kiosk portion 101, and facilitate the transaction so that the user can sell the electronic device at the kiosk portion 101 with greater certainty and speed.

The present technology includes various other types and embodiments of recycling machines. For example, the present technology includes embodiments such as a countertop recycling station and/or a retail store-based interface operated by or with the assistance of a retail employee (such as a partially automated system). As another example, the present technology includes embodiments such as a recycling machine configured to accept all kinds of devices, including larger items (e.g., desktop and laptop computers, televisions, gaming consoles, DVRs, etc.).

The above Detailed Description of examples and embodiments of the invention is not intended to be exhaustive or to limit the invention to the precise form disclosed above. Although specific examples for the invention are described above for illustrative purposes, various equivalent modifications are possible within the scope of the invention, as those skilled in the relevant art will recognize.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

Although the above description describes various embodiments of the invention and the best mode contemplated, regardless how detailed the above text, the invention can be practiced in many ways. Details of the system may vary considerably in its specific implementation, while still being encompassed by the present technology. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A consumer operated kiosk comprising:
  a user interface;
  an inspection area configured to receive a first electronic device from a user;
  a wired and/or wireless connectivity device operably associated with the inspection area and configured to connect to the first electronic device;
  one or more vending units, wherein each of the one or more vending units contains one or more second electronic devices;
  an outlet configured to receive the one or more second electronic devices from the one or more vending units;
  a data transfer compartment separate from the inspection area and the outlet, wherein the data transfer compartment is configured to receive the first electronic device together with at least one of the second electronic devices;
  a data transfer apparatus operably associated with the data transfer compartment; and
  one or more processors operably connected to the wired and/or wireless connectivity device, the one or more vending units, and the data transfer apparatus, wherein the one or more processors are configured to:
    receive a selection of one of the one or more second electronic devices from the user via the user interface, at least partially in response to receiving the selection, cause the vending unit that contains the selected second electronic device to dispense the selected second electronic device to the user via the outlet-after the retraction device has disconnected the wired connector from the selected second electronic device;

transfer data from the first electronic device to the selected second electronic device via the data transfer apparatus when the first electronic device and the selected second electronic device are positioned in the data transfer compartment;

receive characteristic information about the first electronic device via the wired and/or wireless connectivity device; and facilitate a purchase of the first electronic device from the user based at least in part on the characteristic information.

2. The kiosk of claim 1 wherein the one or more processors are further configured to:

determine a price for the first electronic device based at least in part on the characteristic information;

present, to the user, an offer to purchase the first electronic device for the price;

receive an acceptance of the offer from the user;

cause the kiosk to retain the first electronic in response to receiving the acceptance; and cause the kiosk to provide payment of the price to the user in exchange for the first electronic device.

3. The kiosk of claim 1 wherein the one or more processors are further configured to:

present, to the user, a price to purchase the selected second electronic device from the kiosk; and confirm receipt of payment from the user to purchase the selected second electronic device for the price, wherein causing the vending unit that contains the selected second electronic device to dispense the selected second electronic device to the user includes causing the vending unit to dispense the selected second electronic device to the user at least partially in response to confirming receipt of the payment.

4. The kiosk of claim 1, further comprising one or more cameras operably associated with the inspection area, wherein the one or more processors are further configured to perform a visual inspection of the first electronic device via the one or more cameras when the first electronic device is positioned in the inspection area and determine a price for the first electronic device based at least in part on the characteristic information and the visual inspection.

5. The kiosk of claim 4 wherein the visual inspection includes an evaluation of the condition of the first electronic device, and wherein the price for the first electronic device is based at least in part on the characteristic information and the condition of the first electronic device.

6. The kiosk of claim 1 wherein the first electronic device is a mobile phone, and the one or more second electronic devices are mobile phones.

7. The kiosk of claim 1, further comprising a cleaning compartment, the cleaning compartment including an ultraviolet light source and/or other devices for cleaning electronic devices.

8. The kiosk of claim 1 wherein the
data transfer apparatus includes a wireless connection configured to wirelessly connect to the selected second electronic device, and wherein the one or more processors are configured to transfer data from the first electronic device to the selected second electronic device via the wireless connection.

9. The kiosk of claim 1 wherein the
data transfer apparatus includes a first wired connector configured to connect to the first electronic device and a second wired connector configured to connect to the selected second electronic device, and wherein the one or more processors are configured to transfer data from the first electronic device to the selected second electronic device via the first and second wired connectors.

10. The kiosk of claim 1
wherein the data transfer apparatus includes a first wireless connection configured to connect to the first electronic device and a second wireless connection configured to connect to the selected second electronic device, and wherein the one or more processors are configured to transfer data from the first electronic device to the selected second electronic device via the first and second wireless connections.

11. The kiosk of claim 1 wherein the data transfer apparatus is configured to wirelessly transfer data from the first electronic device to the selected second electronic device.

12. The kiosk of claim 1 wherein at least a portion of the transfer of data from the first electronic device to the selected second electronic device is via a wireless connection.

13. The kiosk of claim 1 wherein the vending unit that contains the selected second electronic device includes a wired connector operably connected to the selected second electronic device.

14. The kiosk of claim 13 wherein the one or more processors are further configured to provide power to the selected second electronic device via the wired connector.

15. The kiosk of claim 13 wherein the one or more processors are further configured to transfer data from the first electronic device to the selected second electronic device via the wired connector.

16. The kiosk of claim 13 wherein the wired connector is a first wired connector, wherein the
data transfer apparatus includes second wired connector configured to connect to the selected second electronic device, and wherein the one or more processors are further configured to transfer data from the first electronic device to the selected second electronic device via the second wired connector.

17. The kiosk of claim 13 wherein the wired connector is attached to a cable, and wherein the kiosk further comprises a retraction device configured to retract the cable after disconnection of the wired connector from the selected second electronic device.

18. The kiosk of claim 13 herein the one or more processors are further configured to transfer data from the first electronic device to the selected second electronic device via the wired and/or wireless connectivity device and the wired connector.

19. The kiosk of claim 13 wherein the one or more processors are further configured to transfer data to the selected second electronic device via the wired connector.

20. The kiosk of claim 13 wherein the one or more processors are further configured to transfer an application program to the selected second electronic device via the wired connector.

21. The kiosk of claim 13 wherein the wired connector is a first wired connector, wherein the
data transfer apparatus includes a second wired connector configured to connect to the selected second electronic device, and wherein the one or more processors are further configured to transfer data from the first electronic device to the selected second electronic device via the wired and/or wireless connectivity device and the second wired connector.

22. The kiosk of claim 1 wherein the characteristic information about the first electronic device includes at least one of an identifier, a make, or a model of the first electronic device.

23. A consumer operated kiosk comprising:
a user interface;
an inspection area configured to receive a first electronic device from a user;
a wired and/or wireless connectivity device operably associated with the inspection area and configured to connect to the first electronic device;
one or more vending units, wherein each of the one or more vending units contains one or more second electronic devices;
an outlet configured to receive the one or more second electronic devices from the one or more vending units;
a data transfer compartment separate from the inspection area and the outlet;
a first wired connector positioned in the data transfer compartment and configured to connect to the first electronic device;
at least a second wired connector positioned in the data transfer compartment and configured to connect to at least one of the one or more second electronic devices; and
one or more processors operably connected to the wired and/or wireless connectivity device, the one or more vending units, the first wired connector and the second wired connector, wherein the one or more processors are configured to:
receive a selection of one of the one or more second electronic devices from the user via the user interface;
cause the vending unit that contains the selected second electronic device to dispense the selected second electronic device to the user via the outlet at least partially in response to receiving the selection;
transfer data from the first electronic device to the selected second electronic device via the first and second wired connectors;
receive characteristic information about the first electronic device via the wired and/or wireless connectivity device operably associated with the inspection area; and
facilitate a purchase of the first electronic device from the user based at least in part on the characteristic information.

24. The kiosk of claim 23 wherein the data transfer compartment is configured to receive the first electronic device and the selected second electronic device.

25. The kiosk of claim 24 wherein the data transfer compartment includes a lockable door configured to prevent access to the first electronic device and the selected second electronic when the first electronic device and the selected second electronic device are positioned in the data transfer compartment and the door is locked.

26. The kiosk of claim 25 wherein the one or more processors are further configured to unlock the door in response to receiving a unique code via the user interface.

27. The kiosk of claim 23 wherein the one or more processors are further configured to:
determine a price for the first electronic device based at least in part on the characteristic information;
present, to the user, an offer to purchase the first electronic device for the price;
receive an acceptance of the offer from the user;
cause the kiosk to retain the first electronic in response to receiving the acceptance; and
cause the kiosk to provide payment of the price to the user in exchange for the first electronic device.

28. The kiosk of claim 23, further comprising one or more cameras operably associated with the inspection area, wherein the one or more processors are further configured to perform a visual inspection of the first electronic device via the one or more cameras when the first electronic device is positioned in the inspection area and determine a price for the first electronic device based at least in part on the characteristic information and the visual inspection.

29. The kiosk of claim 28 wherein the visual inspection includes an evaluation of the condition of the first electronic device, and wherein the price for the first electronic device is based at least in part on the characteristic information and the condition of the first electronic device.

30. The kiosk of claim 23 wherein the first electronic device is a mobile phone, and the one or more second electronic devices are mobile phones.

31. The kiosk of claim 23 wherein the characteristic information about the first electronic device includes at least one of an identifier, a make, or a model of the first electronic device.

* * * * *

UNITED STATES PATENT AND TRADEMARK OFFICE
CERTIFICATE OF CORRECTION

| | | |
|---|---|---|
| PATENT NO. | : 11,989,710 B2 | Page 1 of 1 |
| APPLICATION NO. | : 16/719699 | |
| DATED | : May 21, 2024 | |
| INVENTOR(S) | : Babak Forutanpour et al. | |

It is certified that error appears in the above-identified patent and that said Letters Patent is hereby corrected as shown below:

On the Title Page
On the page 7, in Column 2, under item (56) "Other Publications", Line 21, delete "avaiiabie" and insert -- available --.
On the page 8, in Column 2, under item (56) "Other Publications", Line 18, delete "Invitationto" and insert -- Invitation to --.
On the page 8, in Column 2, under item (56) "Other Publications", Line 32, delete "recylcing,"" and insert -- recycling," --.

In the Specification
In Column 2, Line 35, delete "technology," and insert -- technology. --.
In Column 4, Line 18, delete "Watch" and insert -- Watch™, --.
In Column 4, Line 19, delete "Wear" and insert -- Wear™ --.
In Column 6, Line 1, delete "OR" and insert -- QR --.
In Column 10, Line 37, after "KIOSK" insert -- FOR --.
In Column 10, Line 46, delete "Google" and insert -- Google® --.
In Column 10, Line 55, delete "etc," and insert -- etc. --.
In Column 17, Line 13, delete "Google" and insert -- Google® --.
In Column 21, Line 38, delete "etc," and insert -- etc. --.

In the Claims
In Column 28, Line 57, in Claim 1, after "...one of the" insert -- one or more --.
In Column 28, Lines 66-67, in Claim 1, delete "interface," and insert -- interface; --.
In Column 29, Lines 4-7, in Claim 1, delete "outlet-after the retraction device has disconnected the wired connector from the selected second electronic device;" and insert -- outlet; --.
In Column 29, Line 27, in Claim 2, after "electronic" insert -- device --.
In Column 30, Line 41, in Claim 16, after "includes" insert -- a --.
In Column 30, Line 52, in Claim 18, delete "herein" and insert -- wherein --.
In Column 32, Line 24, in Claim 27, after "electronic" insert -- device --.

Signed and Sealed this
Fourth Day of February, 2025

Coke Morgan Stewart
*Acting Director of the United States Patent and Trademark Office*